(12) United States Patent
Kato et al.

(10) Patent No.: US 6,504,966 B2
(45) Date of Patent: Jan. 7, 2003

(54) OPTICAL DEFLECTING ELEMENT, OPTICAL SWITCH MODULE, LIGHT SIGNAL SWITCHING DEVICE

(75) Inventors: Masayuki Kato, Kawasaki (JP); Akio Sugama, Kawasaki (JP); Koji Tsukamoto, Kawasaki (JP); Masatoshi Ishii, Kawasaki (JP); Kishio Yokouchi, Kawasaki (JP); Yasuo Yamagishi, Kawasaki (JP); Motoyuki Nishizawa, Kawasaki (JP); Tsuyoshi Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/077,342

(22) Filed: Feb. 15, 2002

(65) Prior Publication Data

US 2002/0114556 A1 Aug. 22, 2002

(30) Foreign Application Priority Data

Feb. 16, 2001 (JP) .......................... 2001-040006
Oct. 30, 2001 (JP) .......................... 2001-332169

(51) Int. Cl.[7] ............................... G02B 6/26
(52) U.S. Cl. ............................................. 385/16
(58) Field of Search ............................. 385/16, 15, 14; 257/437

(56) References Cited

U.S. PATENT DOCUMENTS 5,319,725 A * 6/1994 Buchmann et al. ........... 385/14
5,394,490 A * 2/1995 Kato et al. ................... 257/432

FOREIGN PATENT DOCUMENTS

| JP | 09-005797 A | 1/1997 | .......... G02F/1/295 |
| JP | 12-180904 A | 6/2000 | .......... G02F/1/29 |
| JP | 12-180905 A | 6/2000 | .......... G02F/1/313 |

* cited by examiner

Primary Examiner—Akm E. Ullah
(74) Attorney, Agent, or Firm—Coudert Brothers LLP

(57) ABSTRACT

A prism pair is employed as an optical deflecting element. The prism pair is constructed by a slab waveguide, and first and second upper electrodes and first and second lower electrodes arranged on and under the slab waveguide. These electrodes are shaped into a wedge shape (e.g., triangular shape), and change the refractive index of a part of the slab waveguide by utilizing the electrooptic effect to change the propagation direction of light.

19 Claims, 35 Drawing Sheets

FIG. 14

|  | LiNbO3 | PZT Sol-Gel Method | PLZT Sintered Film |
|---|---|---|---|
| α | 45deg |  |  |
| n | 2.2 | 2.4 | 2.4 |
| r | 30pm/V | 50pm/V | 612pm/V |
| E | 10V/μm | 100V/μm | 8.2V/μm |
| Δn | 0.0016 | 0.034 | ← |
| θ /Prism Pair | 0.08deg | 1.64deg | ← |
| m (Prism Pair Number) | 63 | 4 | ← |
| Optical Loss | 1dB/cm | 1.7dB/cm | 0.7dB/cm |

Interlayer Shift

Waveguide Layer 1

Waveguide Layer 2

In-Plain Bending

OPTICAL DEFLECTING ELEMENT, OPTICAL SWITCH MODULE, LIGHT SIGNAL SWITCHING DEVICE

CROSS-REFERENCE TO RELATED APLICATIONS

This application is based upon and claims priority of Japanese Patent Applications No. 2001-040006, filed in Feb. 16, 2001 and Japanese Patent Applications No. 2001-332169, filed in Oct. 30, 2001, the contents being incorporated herein by reference.

BACKGROUND OF THE INVENTION

1. Field of the Invention

The present invention relates to an optical deflecting element for deflecting the light, an optical switch module for switching a propagation destination of the light signal between a plurality of input ports and a plurality of output ports, a light signal switching device employing the optical switch module, and an optical wiring substrate having a mirror for changing the propagation direction of the light signal.

2. Description of the Prior Art

In recent years, the transmission band of the optical communication is increased steadily and also the higher speed and the larger capacity are accelerated conjointly with the progress of the WDM (wavelength division multiplexing) technology. In order to construct the hardware infrastructure of the optical fiber network in the trunk communication network, the light signal switching device f or switching the transmission destination of the optical signal is needed.

In th e prior art, the optical cross-connecting device that converts the light signal the electric signal once, then switches the transmission destination of the signal by the crossbar switch, and then converts the electric signal into the light signal once again is the mainstream as the light signal switching device. In this case, if the data transmission rate exceeds 10 Gb/s, it is difficult to construct the switching device by the electric switching elements like the prior art.

If the optical transmission path is switched by using the optical switching elements in place of the electric switching elements, the conversion between the light and the electricity is not needed and thus the optical cross-connecting device that does not depend on the rate (frequency) of the light signal can be constructed. At present, the optical switch module whose input port number is 32 and whose output port number is 32 (32×32 channels) is implemented. Also, there is the example in which the nonocclude switching network (light signal switching device) is constructed by connecting such optical switch modules in a multi-stage fashion.

In the optical switch module in the prior art, normally the movable micro mirror is employed as the optical switching element. That is, the propagation direction of the light signal is switched by controlling the direction of the micro mirror by the electric signal. The micro mirror can be formed by using the MEMS (MicroElectroMechanical System) technology. The optical switch module is constructed by arranging a number of micro mirrors in two directions (the X direction and the Y direction).

Also, the switching element (optical deflecting element) utilizing the electrooptic effect has been developed. FIG. 1A is a plan view showing the optical deflecting element in the prior art, and FIG. 1B is a sectional view showing the same (Patent Application Publication (KOKAI) Hei 9-5797). As shown in FIGS. 1A and 1B, in the optical deflecting element in the prior art, the optical waveguide 11 having the electrooptic effect is formed on the conductive or semiconductive single crystal substrate 10, and then the upper electrode 12 is formed thereon. The upper electrode 12 is formed as a wedge shape (right triangle shape) having a side that orthogonally intersects with the optical axis of the incident light (called a base hereinafter) and a side that obliquely intersects with the optical axis (called an oblique side hereinafter).

In the optical deflecting element constructed in this manner, as shown in FIG. 1A, the light is incident upon the optical waveguide 11 from the base side of the upper electrode 12 and is emitted from the oblique side of the upper electrode 12. If the voltage is applied between the upper electrode 12 and the lower electrode while using the substrate 10 as the lower electrode, the refractive index of the optical waveguide 11 under the upper electrode 12 is changed to cause the difference in the refractive index of such portion among the periphery. The light passing through the optical waveguide 11 is refracted at the portion whose refractive index is changed and thus the traveling direction is changed. In other words, the outgoing direction of light can be controlled by changing the voltage that is applied between the upper electrode 12 and the substrate 10.

Meanwhile, in the case that the light signal is transmitted between the optical devices, it is possible to connect the optical devices via the optical fibers if the number of the wirings (optical wirings) is small. However, if the number of the wirings is in excess of several hundreds to several thousands, it is advantageous from respects of the easiness of the connecting operation and the space to connect the optical devices by the optical waveguides rather than the connection via the optical fibers.

It is rarely the case that all the optical waveguides for connecting the optical devices can be formed by the straight line. Normally, the optical waveguides are formed to detour the electric parts, the electric wirings, the connectors, and other optical waveguides mounted on the substrate. In this case, since the light has the high straight traveling property, the optical waveguides must be formed along the curve having the large curvature or the propagation direction of light must be changed sharply by the reflection mirror.

If the optical waveguides must be formed along the curve having the large curvature, the layout space of the optical waveguides is increased. Therefore, there is the drawback that it is difficult to form a large number of optical waveguides. In contrast, if the reflection mirror is employed, there is the advantage that the optical waveguides of high density can be integrated. As the reflection mirror, there are the total reflection mirror that totally reflects the light based on the difference in the refractive index and the metal mirror that is formed of the metal film.

The inventors of the present invention consider that problems described in the following are present in the above optical switch module in the prior art.

In the optical switch module that is constructed by integrating the micro mirrors, a module size of the 32×32 channel module containing light input/output ports (fiber connectors), for example, becomes several tens cm square. In order to achieve the nonocclude optical cross-connecting device on a scale of 1000×1000 channels that is requested in the market, the optical switch modules must be constructed in a three-stage fashion by using 192 optical switch modules, for example.

Also, as described above, the wavelength division multiplexing (WDM) technology is employed to improve the throughput of the data transmission, and the light signal having plural wavelengths is transmitted collectively over one optical fiber. Therefore, the multiplied light signal must be passed through the optical branching filter to separate plural wavelengths into individual wavelengths before such multiplied light signal is input into the optical switch module. As the optical branching filter, there are the optical branching filter using the interference filter, the AWG (Arrayed Waveguide Grating) optical branching filter based on the waveguide technology, etc.

In addition, the optical multiplexer is needed to transmit the wavelength-multiplexed light signal once again after the propagation path of the light signal is switched by the light signal switching device. The optical multiplexer executes the multiplexing of the light signal based on the opposite principle to the optical branching filter.

Both the optical branching filter and the optical multiplexer are formed in the form of module and are connected to the optical switch module via the optical fiber. If the light signal switching device on the scale of 1000×1000 channels is constructed by employing the conventional optical switch modules, the number of the optical fibers that connect the optical switch modules, the optical switch module and the optical branching filter, and the optical switch module and the optical multiplexer is increased up to 6000. For this reason, it is not practical to construct the light signal switching device on the scale of 1000×1000 channels by the above optical switch modules in the prior art.

In Patent Application Publication (KOKAI) 2000-180905, there is set forth the optical switch (optical switch module) that has the incident side optical waveguide, the collimate lens, the optical deflecting element constructed by arranging the electrode on and under the slab waveguide, the converging lens, and the outgoing side optical waveguide. However, in the optical switch in Patent Application Publication (KOKAI) 2000-180905, the conductive or semi-conductive single crystal substrate is used as the common lower electrode to all the optical deflecting elements, and also all the upper electrodes are directed in the same direction. Therefore, the deflection angle of one optical deflecting element is small and thus the interval between the input side optical deflecting element and the output side optical deflecting element must be set large to increase the number of input/output ports. As a result, in the optical switch in Patent Application Publication (KOKAI) 2000-180905, the miniaturization of the device is insufficient.

The problems described in the following are considered in the optical deflecting element shown in FIGS. 1A and 1B.

In the optical deflecting element shown in FIGS. 1A and 1B, it is needed that the substrate 10 is conductive or semi-conductive. But it is not easy to form the conductive or semi-conductive single crystal substrate having the size required for the optical deflecting element, and thus the yield of fabrication is low.

Also, it is difficult to give the conductivity to the single crystal substrate to the same extent as the metal, the electric resistance of the substrate causes the signal delay, and the high-speed operation becomes difficult.

In addition, the electrode is provided on and under the substrate. Therefore, if the optical deflecting element is to be mounted on other substrate, one electrode can be connected directly to the substrate by the solder, or the like, but the other electrode must be connected individually to the electrode on the substrate via the wirings, or the like. As a result, there is such a drawback that the packaging steps become complicated.

The problems described in the following are considered in the optical wiring substrate having the reflection mirror in the prior art.

That is, as described above, as the reflection mirror employed in the optical wiring, there are the total reflection mirror and the metal mirror. The metal mirror can avoid the transmission of light substantially perfectly if the type and the film thickness of the metal are set properly. In this case, since a part of light is absorbed by the metal film, it is impossible to suppress the optical loss to zero. Also, in the optical wiring circuit, in some cases the reflection mirror must be formed perpendicularly to the substrate surface. But there is also the problem that it is difficult to form the metal film on the surface that is perpendicular to the substrate surface.

The total reflection mirror utilizes the event that, when the light goes into the interface between the layer of the high refractive index and the layer of the low refractive index at an angle that is larger than the critical angle, such light can be totally reflected. However, since the light propagates through the optical waveguide to have a certain angular width, a part of the light does not satisfy the total reflection condition and then transmits through the total reflection mirror to cause the optical loss.

SUMMARY OF THE INVENTION

It is an object of the present invention to provide an optical switch module a size of which can be reduced much more in contrast to the prior art, and a light signal switching device constructed by employing the optical switch module.

It is another object of the present invention to provide an optical deflecting element which can execute the high-speed operation without the conductive or semi-conductive substrate and which can be mounted on other substrate by simple steps, and an optical switch module constructed by employing the optical deflecting element.

It is still another object of the present invention to provide an optical wiring substrate having a mirror which has small loss and which is readily manufactured.

An optical switch module set forth in claim 1 of the present invention comprises a collimate portion for collimating individually a plurality of light signals respectively; a plurality of first optical deflecting elements for switching propagation directions of the light signals, which are passed through the collimate portion, individually respectively by utilizing an electrooptic effect; a common optical waveguide through which the light signals, which are passed through the plurality of first optical deflecting elements respectively, are propagated; a plurality of second optical deflecting elements for switching the propagation directions of the light signals, which are passed through the common optical waveguide, individually respectively by utilizing the electrooptic effect; and a converging portion for converging the light signals, which are passed through the plurality of second optical deflecting elements, individually respectively; wherein each of the first optical deflecting elements and the second optical deflecting elements is constructed by one or plural prism pairs, and each of the prism pairs includes a slab waveguide formed of material having the electrooptic effect, first and second upper electrodes formed as a wedge shape and arranged on a light signal passing area of the slab waveguide such that wedge top ends are directed mutually oppositely, and first and second lower electrodes arranged under the slab waveguide so as to oppose to the first and second upper electrodes.

In the present invention, the prism pair is employed as an optical deflecting element. The prism pair is constructed by the slab waveguide formed of material having the electrooptic effect, and first and second upper electrodes and first and second lower electrodes arranged on and under the slab waveguide. These electrodes are shaped into the wedge shape (e.g., a triangular shape), and change the refractive index of a part of the slab waveguide by utilizing the electrooptic effect to change the propagation direction of light. In this case, since the propagation direction of light is changed between the first upper electrodes and the first lower electrodes and also the propagation direction of light is changed between the second upper electrodes and the second lower electrodes, the propagation direction of light can be largely changed. Also, since the first and second upper electrodes are arranged such that their wedge top ends are directed mutually oppositely, the first lower electrodes are opposed to the first upper electrodes, and the second lower electrodes are opposed to the second upper electrodes, the alignment density of the electrodes can be increased. Because of these reasons, the size of the optical switch module can be extremely reduced rather than the prior art.

Also, since the prism pairs, the collimate lens, the converging lens, etc. are formed integrally on the substrate, the size of the optical switch module can be reduced much more.

A light signal switching device set forth in claim 5 of the present invention comprises a first optical switch module group constructed by arranging a plurality of first optical switch modules; a second optical switch module group constructed by arranging a plurality of second optical switch modules and connected optically to the first optical switch module group; and a third optical switch module group constructed by arranging a plurality of third optical switch modules and connected optically to the second optical switch module group; wherein each of the first, second and third optical switch module includes (1) a collimate portion for collimating individually a plurality of light signals respectively, (2) a plurality of first optical deflecting elements for switching propagation directions of the light signals, which are passed through the collimate portion, individually respectively by utilizing an electrooptic effect, (3) a common optical waveguide through which the light signals, which are passed through the plurality of first optical deflecting elements respectively, are propagated, (4) a plurality of second optical deflecting elements for switching the propagation directions of the light signals, which are passed through the common optical waveguide, individually respectively by utilizing the electrooptic effect, and (5) a converging portion for converging the light signals, which are passed through the plurality of second optical deflecting elements, individually respectively, and wherein each of the first and second optical deflecting elements is constructed by one or plural prism pairs, and each of the prism pairs includes a slab waveguide formed of material having the electrooptic effect, first and second upper electrodes formed as a wedge shape and arranged on a light signal passing area of the slab waveguide such that wedge top ends are directed mutually oppositely, and first and second lower electrodes arranged under the slab waveguide so as to oppose to the first and second upper electrodes.

Since the light signal switching device of the present invention employs the optical switch module having the above structure, the optical switch modules, the optical branching filter and the first optical switch module group, and the third optical switch module group and the optical multiplexer is connected via optical connectors having a plurality of lenses, which are aligned in a one-dimensional or two-dimensional direction, for example, respectively. Accordingly, the size of the device can be extremely reduced rather than the conventional light signal switching device in which respective devices are connected via the optical fibers.

An optical wiring substrate set forth in claim 13 of the present invention comprises an optical waveguide having a bended shape; and a dielectric multi-layered film mirror having a plurality of slits provided to a bending portion of the optical waveguide as a part of a multi-layered structure.

The lights are multiply-reflected by respective layers of the dielectric multi-layered film mirror, but the lights cause the loss if these lights cannot enter into the inside of the optical waveguide. Therefore, in order to guide the light reflected in the interior of the multi-layered structure so as to enter into the optical waveguide, the plane that is parallel with the reflection plane of the dielectric multi-layered film mirror and contains an intersection point of center lines of the optical waveguide at the bending portion is set in the inside of the dielectric multi-layered film mirror.

As normally known, if the material, the thickness of respective layers, and the layer number of the high refractive-index layer and the low refractive-index layer are set properly in response to the wavelength of the reflected light, the dielectric multi-layered film mirror can get the reflectance of 100%. Since the lights propagate through the optical waveguide with a certain angle width, a part of the lights does not satisfy the total reflection conditions. Mainly such light out of the lights, that are incident upon the reflection plane of the dielectric multi-layered film mirror, has the small angle to the normal of the reflection plane. Therefore, if a periodic structure of dielectric layers of the dielectric multi-layered film mirror is set to lights, that have a smaller angle to a normal of a reflection plane than a center line of the optical waveguide, out of lights that are incident upon the reflection plane, the lights that transmit through the dielectric multi-layered film mirror can be returned into the inside of the optical waveguide. As a result, the loss caused by the dielectric multi-layered film mirror can be further reduced rather than the prior art.

An optical deflecting element set forth in claim 21 of the present invention comprises a substrate; a first electrode formed on the substrate; an optical waveguide formed on the first electrode and having an electrooptic effect; a wedge-shaped second electrode formed on the optical waveguide at a position that opposes to the first electrode; and a leading electrode formed on the optical waveguide and connected electrically to the first electrode.

In the optical deflecting element of the present invention, since the first electrode is formed on the substrate, the substrate that is suitable for the formation of the optical waveguide can be employed irrespective of the presence of the conductivity of the substrate. Also, in the optical deflecting element of the present invention, the second electrode and the leading electrode are formed on the identical plane, and the lights can be deflected by applying the voltage between these electrodes. Therefore, when the optical deflecting element is mounted on other substrate, these electrodes can be jointed simultaneously to other substrate by using the solder, etc.

An optical switch module set forth in claim 25 of the present invention comprises a collimate portion for collimating individually a plurality of light signals respectively; a plurality of first optical deflecting elements for switching propagation directions of the light signals, which are passed through the collimate portion, individually respectively by utilizing an electrooptic effect; a common optical waveguide through which the light signals, which are passed through the plurality of first optical deflecting elements respectively, are propagated; a plurality of second optical deflecting elements for switching the propagation directions of the light signals, which are passed through the common optical waveguide, individually respectively by utilizing the electrooptic effect; a converging portion for converging the light signals, which are passed through the plurality of second optical deflecting elements, individually respectively; and a first substrate for supporting the collimate portion, the first optical deflecting elements, the common optical waveguide, the second optical deflecting elements, and the converging portion; wherein at least one of the first optical deflecting elements and the second optical deflecting elements is constructed by a second substrate, a first electrode formed on a first-substrate side surface of the second substrate, an optical waveguide formed on a first-substrate side surface of the first electrode and having an electrooptic effect, a wedge-shaped second electrode formed on a first-substrate side surface of the optical waveguide to oppose to the first electrode, and a leading electrode formed on the first-substrate side surface of the optical waveguide and connected electrically to the first electrode, whereby the second electrode and the leading electrode are jointed to electrodes of the first substrate.

The optical switch module of the present invention is constructed by jointing the second substrate on which the optical deflecting elements are formed to the first substrate on which the collimate portion, the common optical waveguide, and the converging portion are formed. As a result, the first substrate can be formed by the substrate having no electrooptic effect, so that the optical loss can be reduced rather than the case where the overall optical switch module is formed on the substrate having the electrooptic effect.

BRIEF DESCRIPTION OF THE DRAWINGS

FIG. 14 is a table showing values of the deflection angle θ per one prism pair, which are theoretically calculated when $LiNbO_3$, PZT, and PLZT are employed as the slab waveguide;

DESCRIPTION OF THE PREFERRED EMBODIMENTS

Embodiments of the present invention will be explained in detail with reference to the accompanying drawings hereinafter.

First Embodiment

Figure 1A:
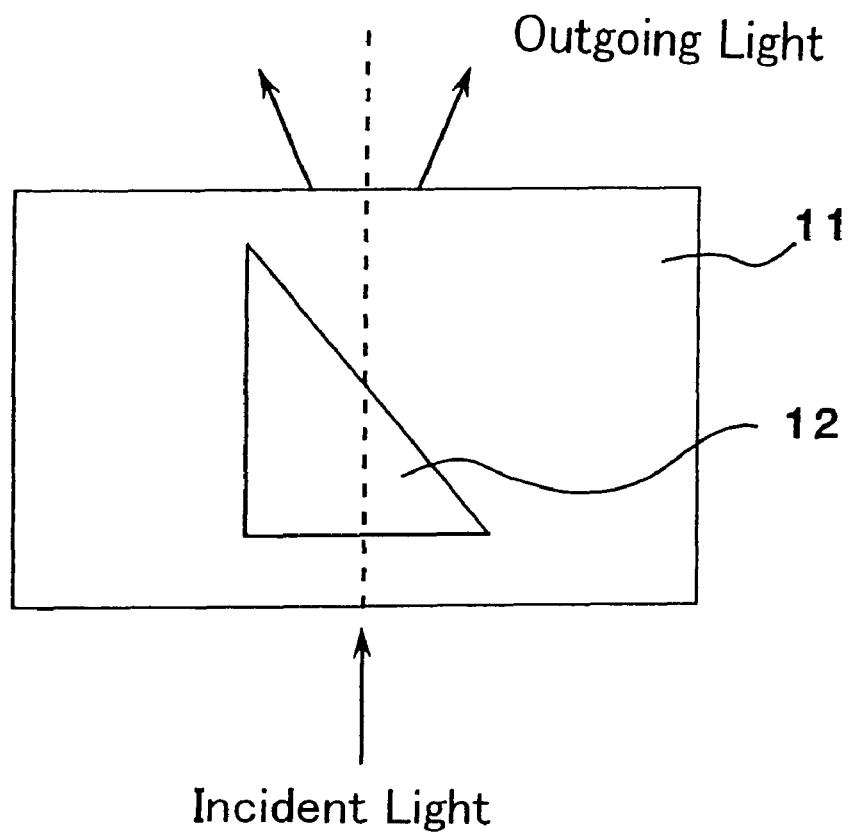
FIG. 1A is a plan view showing an optical deflecting element in the prior art.
Figure 1B:
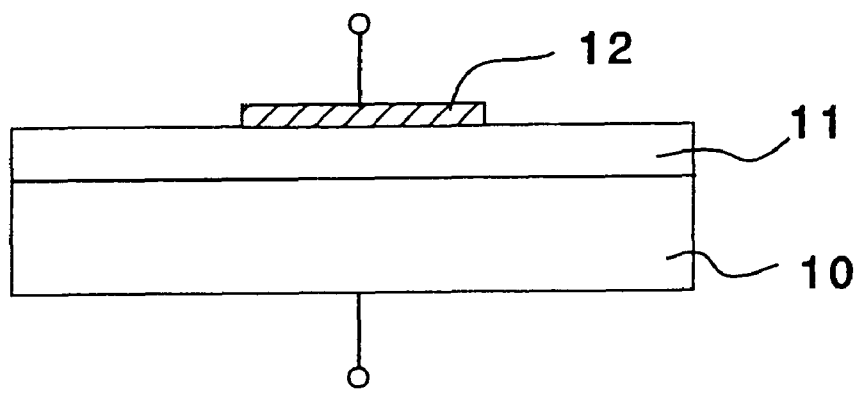
FIG. 1B is a sectional view showing the same.
Figure 2:
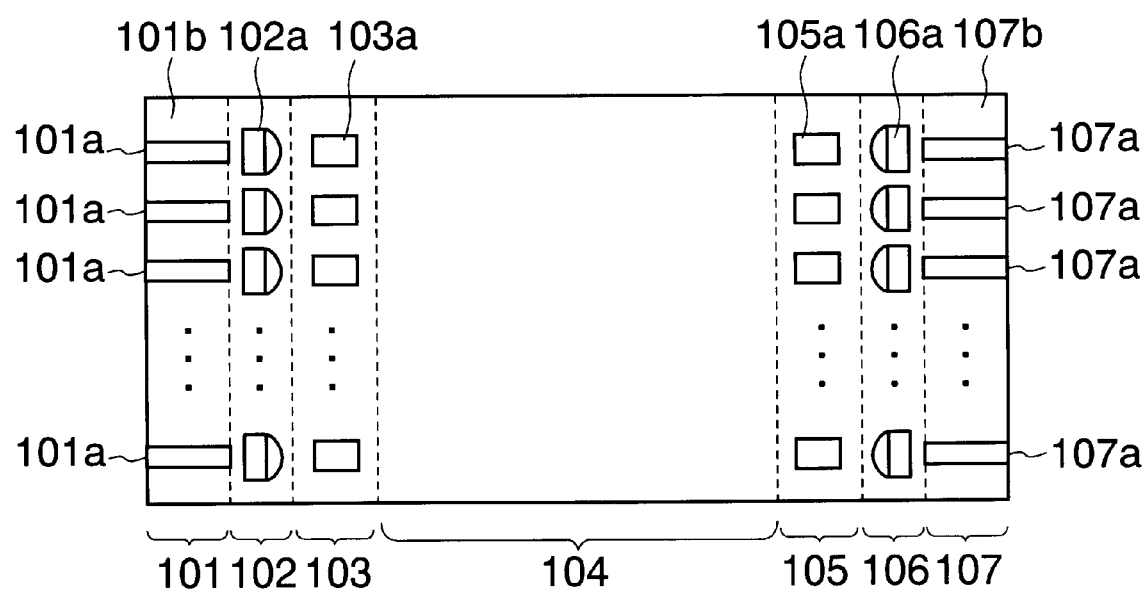
FIG. 2 is a schematic view showing a configuration of an optical switch module according to first embodiment of the present invention.

FIG. 2 is a schematic view showing a configuration of an optical switch module according to first embodiment of the present invention. This optical switch module comprises an incident side optical waveguide portion 101, a collimate portion 102, an incident side optical deflecting element portion 103, a common optical waveguide 104, an outgoing side optical deflecting element portion 105, a converging portion 106, and an outgoing side optical waveguide portion 107. The incident side optical waveguide portion 101, the collimate portion 102, the incident side optical deflecting element portion 103, the common optical waveguide 104, the outgoing side optical deflecting element portion 105, the converging portion 106, and the outgoing side optical waveguide portion 107 are formed integrally on the substrate.

The incident side optical waveguide portion 101 consists of a plurality of optical waveguides (cores) 101a, and a cladding layer 101b that covers these optical waveguides 101a to confine the light in the optical waveguides 101a due to difference in the refractive index. Similarly to this, the outgoing side optical waveguide portion 107 consists of a plurality of optical waveguides (cores) 107a, and a cladding layer 107b that covers these optical waveguides 107a to confine the light in the optical waveguides 107a due to difference in the refractive index.

In the present embodiment, the number of the optical waveguides 101a of the incident side optical waveguide portion 101 is set equal to that of the optical waveguides 107a of the outgoing side optical waveguide portion 107. The number of the optical waveguides 101a (=the number of the optical waveguides 107a) is assumed as n (n is the integer of 2 or more) hereunder. In this case, the present invention is not limited to this, and the number of the incident side optical waveguides and the number of the outgoing side optical waveguides may be set differently.

The collimate portion 102 consists of n collimate lenses 102a. Each collimate lens 102a is arranged at the position that is slightly remote from the end portion of the optical waveguide 101a. The light emitted from the optical waveguide 101a is spread radially and then is shaped into a parallel light by the collimate lens 102a.

N optical deflecting elements 103a are provided to the incident side optical deflecting element portion 103. Each optical deflecting element 103a is arranged at the position that is slightly remote from the collimate lens 102a in the optical axis direction. The detailed explanation of the optical deflecting element 103a will be given later, but the optical deflecting element 103a can change the propagation direction of the light signal by utilizing the Pockels effect (electrooptic effect).

The common optical waveguide 104 consists of a slub waveguide. This common optical waveguide 104 transmits the light, which is passed through the incident side optical deflecting element portion 103, to the outgoing side optical deflecting element portion 105. Plural light signals are simultaneously passed through the common optical waveguide 104, but these light signals can be transmitted without the interference with other light signals since such light signals can straightly propagate in the predetermined direction in the common optical waveguide 104.

Optical deflecting elements (n optical deflecting elements) 105a are provided to the outgoing side optical deflecting element portion 105. These optical deflecting elements 105a deflect the light, which is passed through the common optical waveguide 104 to reach the optical deflecting elements 105a, in the direction in parallel with the optical waveguides 107a. In this case, the optical deflecting elements 103a, 105a have basically the same structure.

The converging portion 106 consists of n converging lenses 106a. These converging lenses 106a have an action to collimate the light, which is passed through the optical deflecting elements 105a, and guide it to the optical waveguides 107a.

Details of the collimate portion 102, the incident side optical deflecting element portion 103, the outgoing side optical deflecting element portion 105, and the converging portion 106 will be explained with reference to FIG. 3 and FIG. 4 hereunder.

Figure 3:
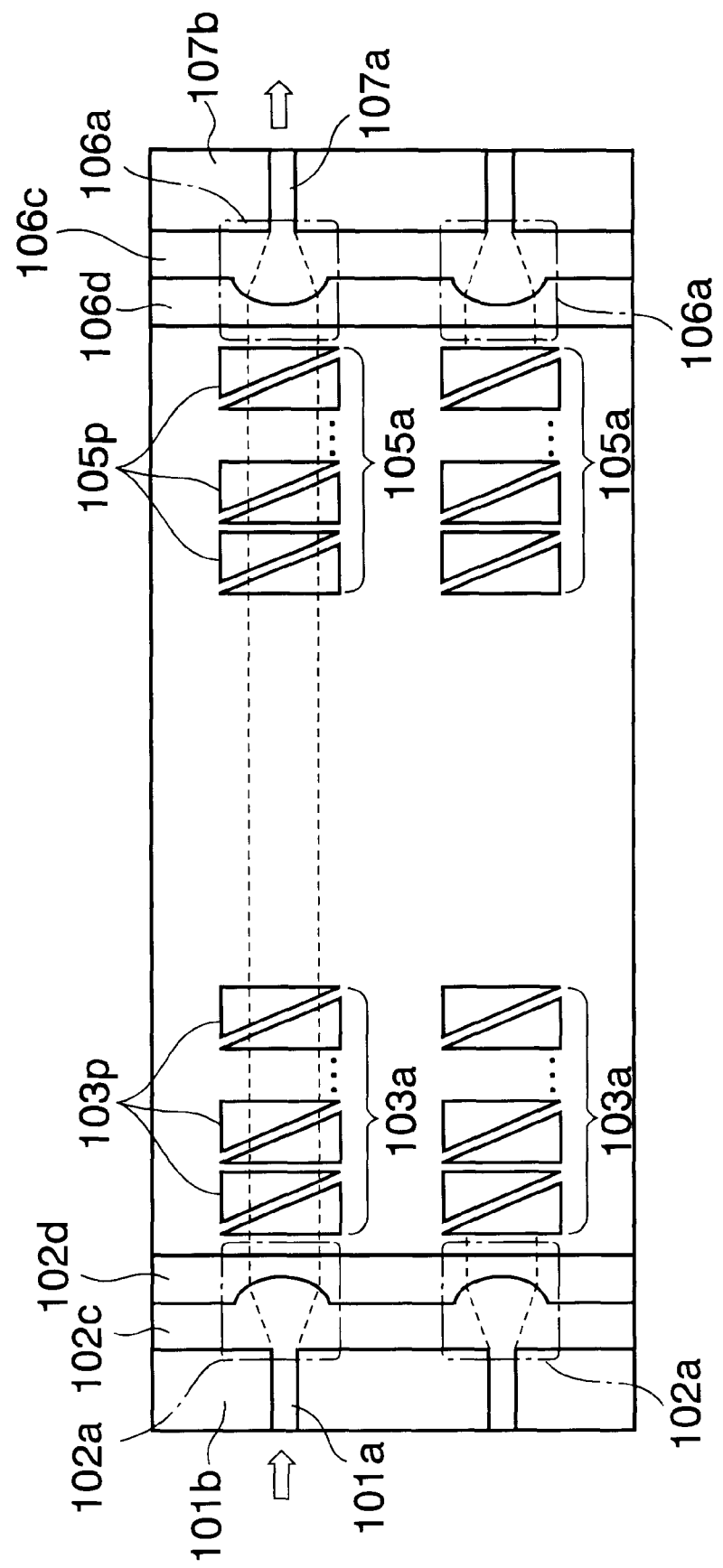
FIG. 3 is a schematic view showing details of a collimate portion, an incident side optical deflecting element portion, an outgoing side optical deflecting element portion, and a converging portion of the optical switch module.
Figure 4:
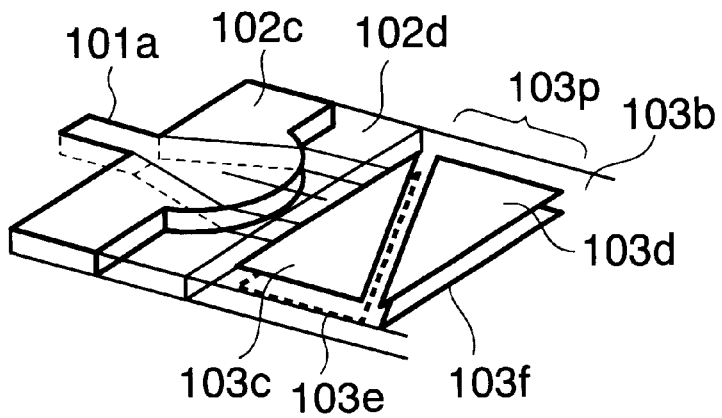
FIG. 4 is a schematic view showing a collimating lens and a prism pair of the optical switch module.

As shown in FIG. 3 and FIG. 4, the collimating lens 102a constituting the collimate portion 102 is a two-dimensional lens that consists of two portions 102c, 102d having different refractive indexes. The portion 102c having the high refractive index (convex lens portion) is formed by the same material as the optical waveguides (core) 101a, 107a. The portion 102d having the low refractive index is formed by the material that can collimate the light by the difference in the refractive index between the portion 102c having the high refractive index and this portion 102d having the low refractive index.

Similarly to the collimating lens 102a, the converging lens 106a of the converging portion 106 also consists of the portion 106c having the high refractive index (convex lens portion) and the portion 106d having the low refractive index. However, in the converging lens 106a, the direction of the lens is opposite to that of the collimating lens 102a.

The optical deflecting elements 103a constituting the incident side optical deflecting element portion 103 consist of one or plural prism pairs 103p. As shown in FIG. 4, one prism pair 103p consists of a slab waveguide 103b formed by the material having the electrooptic effect, first and second upper electrodes 103c, 103d formed on the slab waveguide 103b, and first and second lower electrodes 103e, 103f formed under the slab waveguide 103b. All the first and second upper electrodes 103c, 103d and the first and second lower electrodes 103e, 103f are formed as a right-triangular shape (wedge shape).

The first upper electrode 103c and the first lower electrode 103e are opposed mutually to put the slab waveguide 103b between them. The first upper electrode 103c and the second upper electrode 103d are positioned to make their oblique sides oppose mutually and are arranged closely. The second upper electrode 103d and the second lower electrode 103f are opposed mutually to put the slab waveguide 103b between them. The slab waveguide 103b is common to respective prism pairs 103p.

Similarly to the incident side optical deflecting elements 103a, the optical deflecting elements 105a of the outgoing side optical deflecting element portion 105 consist of the slab waveguide formed by the material having the electrooptic effect, and one or plural prism pairs 105p. Each prism pair 105p consists of a pair of first electrodes (the first upper electrode and the first lower electrode) and a pair of second electrodes (the second upper electrode and the second lower electrode).

Figure 5A:
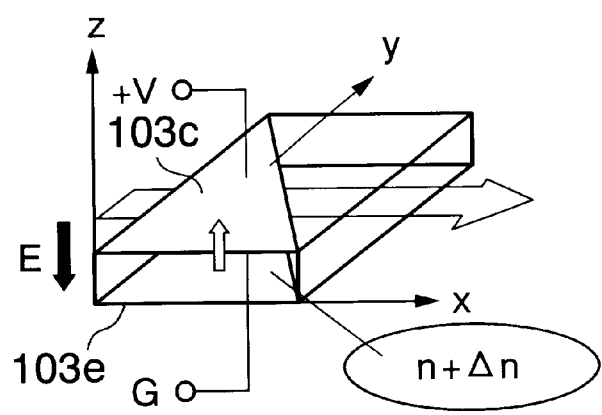
FIGS. 5A and 5B and FIG. 6 are schematic views showing the deflection of light by the prism pair respectively.
Figure 5B:
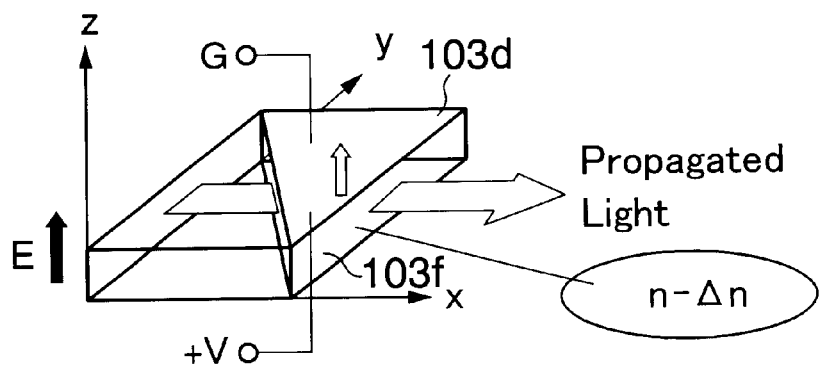

FIGS. 5A and 5B are schematic views showing the deflection of light by the prism pair 103p. In FIGS. 5A and 5B, a white arrow indicates the direction of the crystal axis of the slab waveguide 103b, and a black arrow E indicates the direction of the electric field.

As shown in FIG. 5A, if the first lower electrode 103e is connected to the ground line (G) and the control voltage (+V) is applied to the first upper electrode 103c, the refractive index of the slab waveguide 103b between the first upper electrode 103c and the first lower electrode 103e is changed from n to n+Δn. Thus, the propagation direction of the light signal is deflected toward the left direction only by an angle θ. In contrast, as shown in FIG. 5B, if the second upper electrode 103d is connected to the ground line (G) and the control voltage (+V) is applied to the second lower electrode 103f, the refractive index of the slab waveguide 103b between the second upper electrode 103d and the second lower electrode 103f is changed from n to n−Δn. Thus, the propagation direction of the light signal is further deflected toward the left direction only by an angle θ. The electrodes to which the control voltage is applied (the first upper electrode and the second lower electrode) are also referred to as the control electrode hereinafter.

Figure 6:
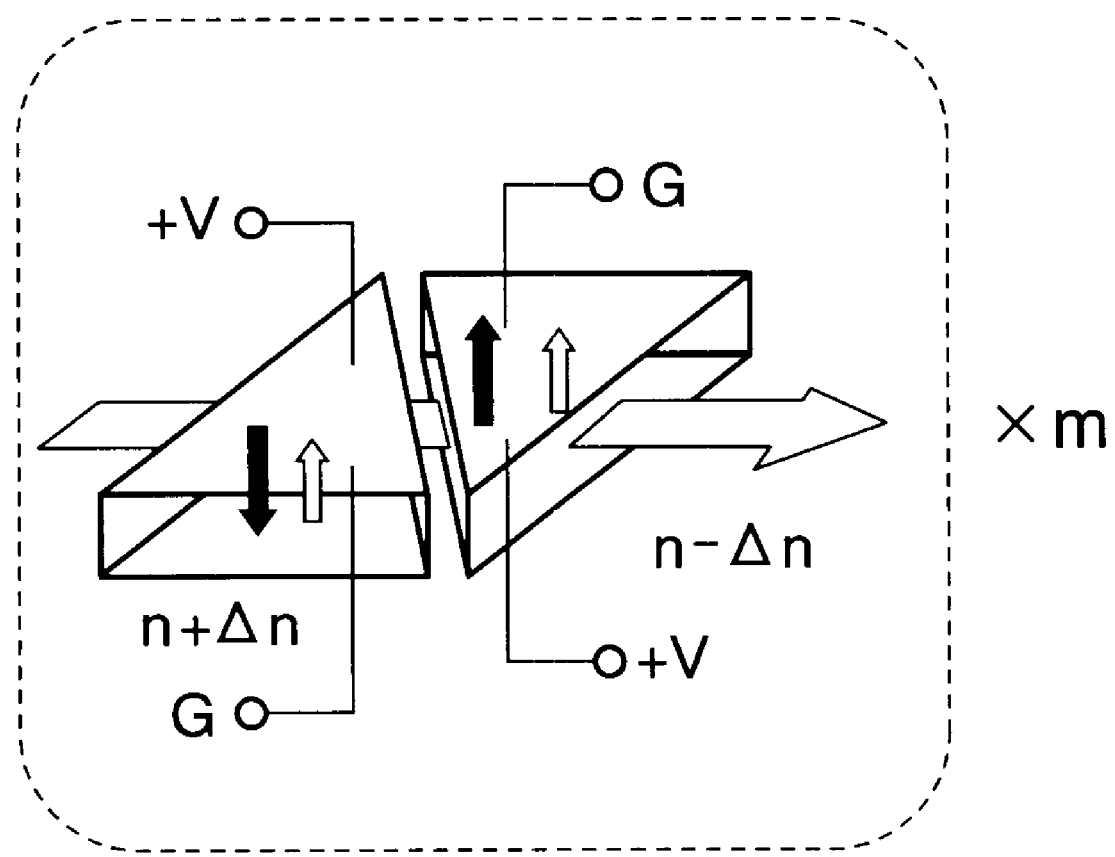

That is, in the first embodiment, the light can be deflected by 2 θ by using one prism pair. As shown in FIG. 6, if m (m is the integer of 2 or more) prism pairs 103p are arranged in series every channel, the propagation direction of the light signal can be deflected by 2θ×m. The electrodes positioned to put the slab waveguide, that is formed by the material having the electrooptic effect, between them may be formed to directly contact to the slab waveguide (the core layer). In this case, if the cladding layer is interposed between these electrodes and the slab waveguide (the core layer), the optical loss caused by the propagation on the metal interface can be avoided.

Also, in the first embodiment, the first upper electrode 103c and the second upper electrode 103d are positioned to make their oblique sides oppose mutually and are arranged closely. Similarly, the first lower electrode 103e and the second lower electrode 103f are positioned to make their oblique sides oppose mutually and are arranged closely. Therefore, the size of the prism pair 103p can be reduced.

Figure 7:
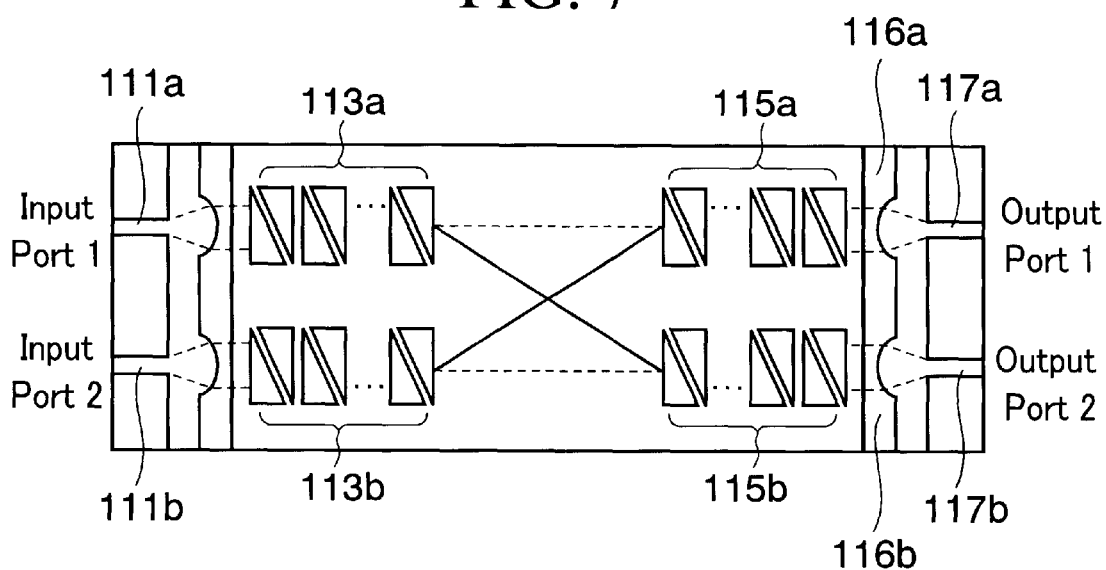
FIG. 7 is a schematic view showing an example in which the present invention is applied to the 2×2-channel optical switch module.

FIG. 7 shows an example in which the present invention is applied to the 2×2-channel optical switch module. In this optical switch module, the first light signal being input into an input port 1 is transmitted to any one of an output port 1 or an output port 2, and the second light signal being input into an input port 2 is transmitted to any one of the output port 1 or the output port 2. For example, if the light signal being input into the input port 1 is transmitted to the output port 1 and the light signal being input into the input port 2 is transmitted to the output port 2, the light signal is not deflected by the optical deflecting elements 113a, 113b, 115a, 115b unless the voltage is applied to all the optical deflecting elements 113a, 113b, 115a, 115b. Accordingly, the light signal being input into the channel waveguide 111a is transmitted to the optical waveguide portion 117a and the light signal being input into the channel waveguide 111b is transmitted to the optical waveguide portion 117b respectively.

If the light signal being input into the input port 1 is transmitted to the output port 2 and the light signal being input into the input port 2 is transmitted to the output port 1, the positive voltage V is applied to the control electrodes of the optical deflecting elements 113a, 115b and the negative voltage V is applied to the control electrodes of the optical deflecting elements 113b, 115a. Accordingly, the light signal being input into the input port 1 is deflected rightward by the optical deflecting element 113a to reach the optical deflecting element 115b, then is deflected by the optical deflecting element 115b in the direction in parallel with the optical waveguide 117b, then is converged by the converging lens 116b to enter into the optical waveguide 117b, and then is transmitted to the output port 2. Similarly, the light signal being input into the input port 2 is deflected leftward by the optical deflecting element 113b to reach the optical deflecting element 115a, then is deflected by the optical deflecting element 115a in the direction in parallel with the optical waveguide 117a, and then is transmitted to the output port 1 via the converging lens 116a and the optical waveguide 117a.

Figure 8:
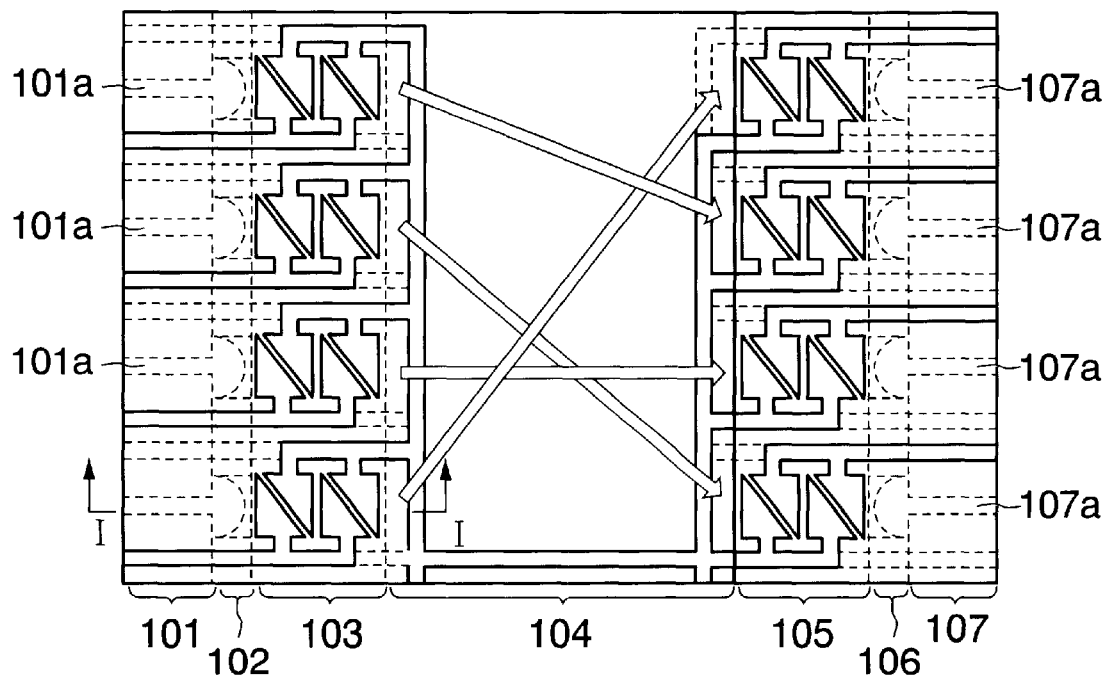
FIG. 8 is a schematic view showing an example in which the present invention is applied to the 4×4-channel optical switch module.

FIG. 8 is a plan view of the 4×4-channel optical switch module. In this case, the same voltage is applied the control electrode of the optical deflecting element on the light signal outputting side and the control electrode of the optical deflecting element on the light signal receiving side. A large number of light signals are simultaneously passed through the common optical waveguide 104, but respective light signals never interfere with each other since the light signals linearly travel in the predetermined directions respectively in the common optical waveguide 104.

A method of manufacturing the optical switch module according to the first embodiment will be explained with reference to sectional views in FIGS. 9A to 9F and plan views in FIGS. 10, 11 and 12 hereinafter. Here, a method of manufacturing the 4×4-channel optical switch module will be explained hereunder. Also, FIGS. 9A to 9F show a cross section taken along a I—I line in FIG. 8. In addition, FIG. 13 is a side view showing one input port.

Figure 9A:
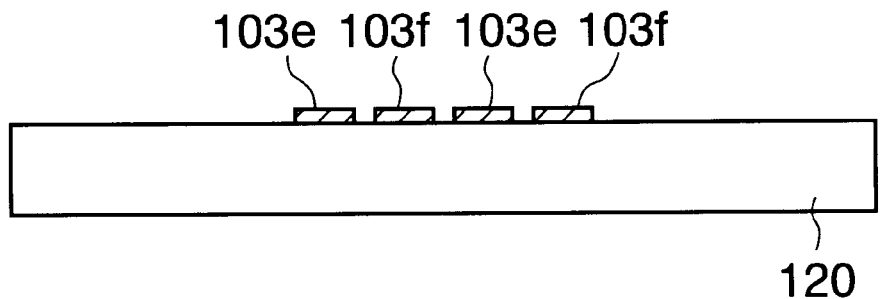
FIGS. 9A to 9F are sectional views showing a method of manufacturing the optical switch module according to first embodiment.
Figure 10:
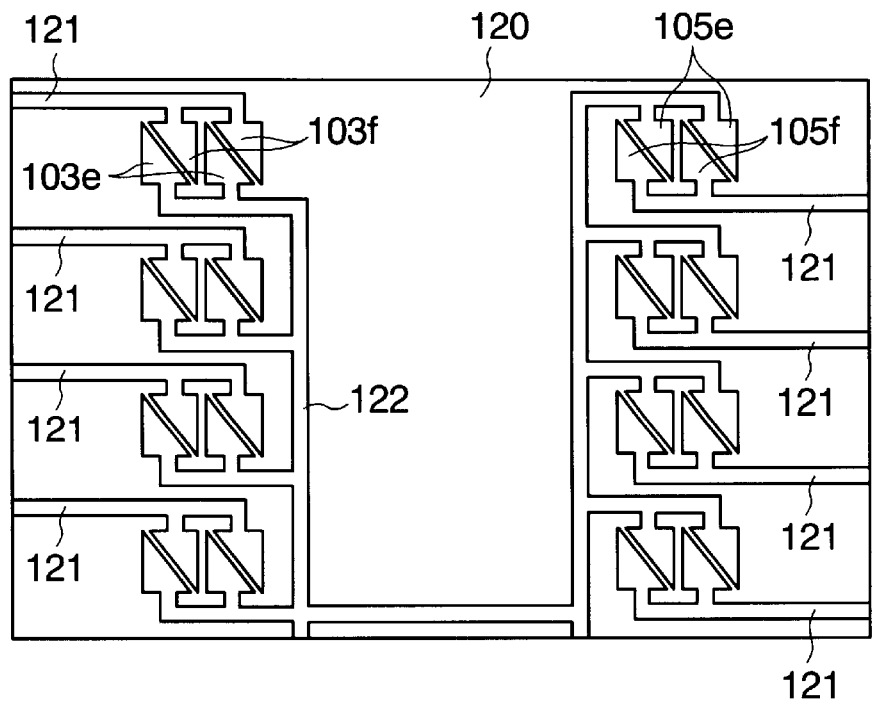
FIGS. 10, 11 and 12 are plan views showing the method of manufacturing the optical switch module according to first embodiment.

First, as shown in FIG. 9A and FIG. 10, an Au (gold) film of about 2000 Å thickness is formed on a silicon substrate 120 by the sputter method. Then, the first and second lower electrodes 103e, 103f of the incident side optical deflecting element 103a, the first and second lower electrode 103e, 103f of the outgoing side optical deflecting element 105a, a signal line 121, and a ground line 122 are formed by patterning the Au film. In this case, as shown in FIG. 10, the first lower electrodes 103e, 105e are connected commonly to the ground line 122, and the second lower electrodes 103f, 105f are connected individually to the signal line 121 every optical deflecting element. The shape of the first and second lower electrodes 103e, 105e, 103f, 105f are the right triangle, for example, and the length of the optical beam in the width direction is set to 200 to 500 μm, for example. Also, the first lower electrode 103e and the second lower electrode 103f are formed closely to make their oblique sides oppose mutually. Similarly, the first lower electrode 105e and the second lower electrode 105f are formed closely to make their oblique sides oppose mutually.

Figure 9B:
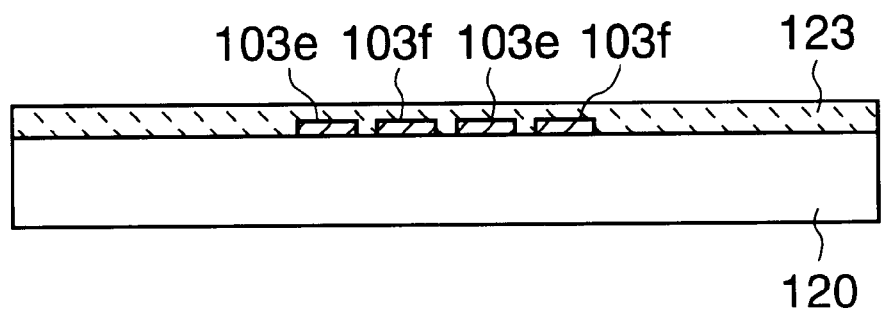

Then, as shown in FIG. 9B, a lower cladding layer 123 having a thickness of 5 μm or less, for example, is formed by coating the epoxy resin whose refractive index for example, is almost 1.5 to 1.6 (for example, UVR6128 (refractive index 1.505): manufactured by Union Carbide Co., Ltd.) on the overall upper surface of the substrate 120. The first and second lower electrodes 103e, 105e, 103f, 105f are covered with this lower cladding layer 123. The material of the lower cladding layer 123 is not limited to the above epoxy resin, and various materials can be employed. For instance, the fluorinated polyimide resin (OPI-N3205 (refractive index 1.52) manufactured by Hitachi Chemical Co., Ltd.) may be employed as the material of the lower cladding layer 123.

Figure 9C:
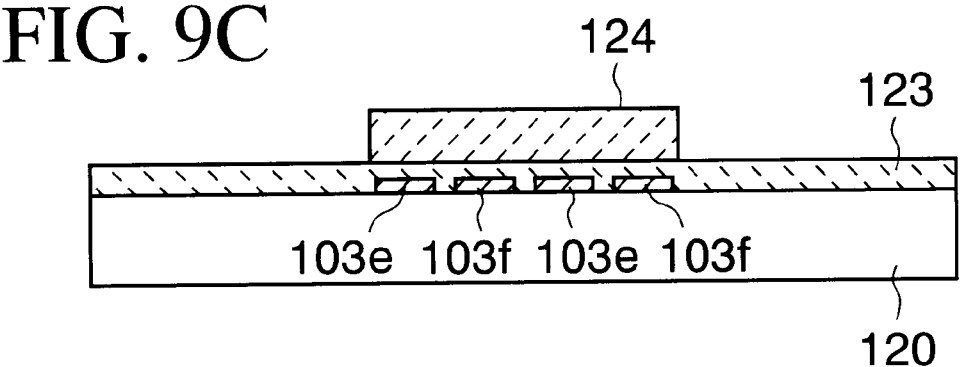

Then, as shown in FIG. 9C, an electrooptic thin film 124 serving as the slab waveguides 103b, 105b is formed in the optical deflecting element portions 103, 105. This electrooptic thin film 124 is formed by coating the organic nonlinear optical material such as paranitroaniline by a thickness of about 5 μm, for example.

As the material of the electrooptic thin film 124, PZT ($Pb(Zr, Ti)O_3$), PLZT (($Pb, La)(Zr, Ti)O_3$), etc., for example, may be employed other than the above organic nonlinear optical material. As the method of forming these electrooptic thin films, there are the sputter method, the sol-gel method, the MOCVD (Metal Organic Chemical Vapor Deposition) method, etc. The formed optical crystal (electrooptic thin film) for example, is polished thin and then pasted onto the lower cladding layer 123.

Figure 9D:
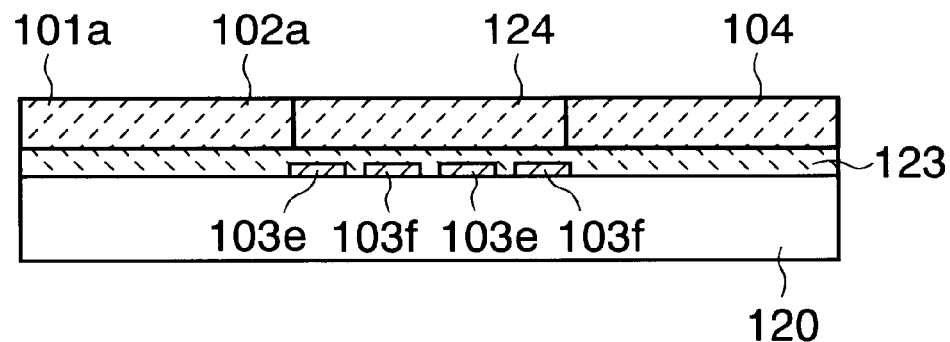
Figure 11:
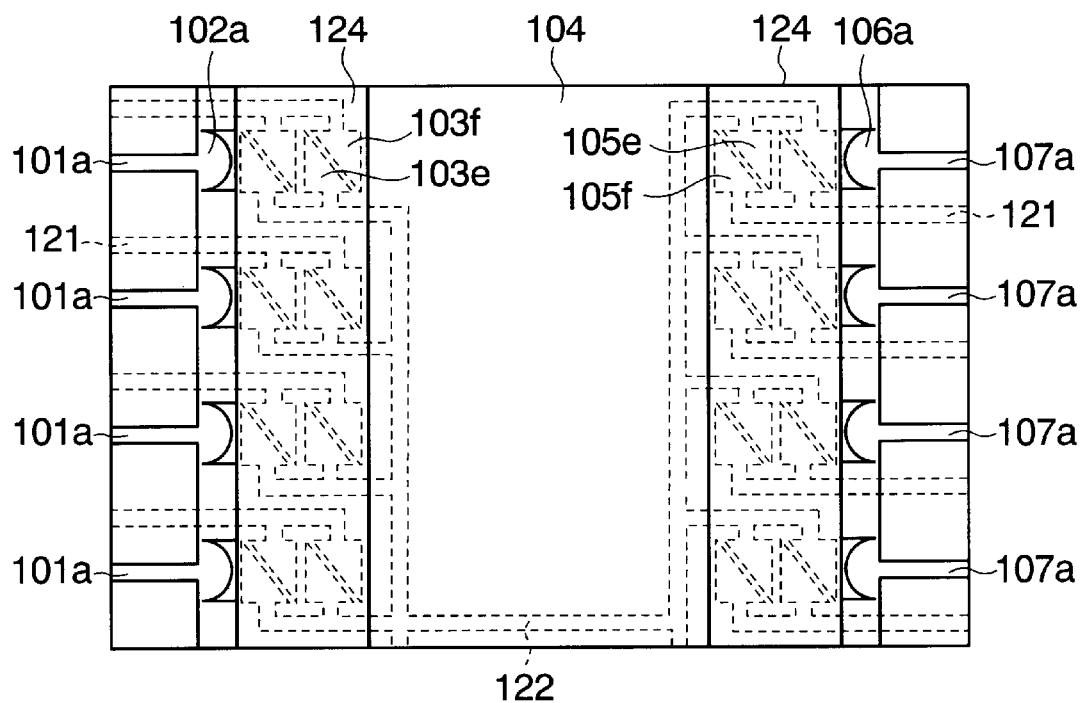

Then, as shown in FIG. 9D and FIG. 11, a resin film is formed by coating a resin, which has the refractive index higher than the lower cladding layer 123, (for example, a resin that contains bisphenyl A diglycidyl as the principal component to adjust the refractive index to 1.520) on the substrate 120. Then, the optical waveguides (cores) 101a, 107a, the collimate lens 102a, the converging lens 106a, and the common optical waveguide 104 are formed by patterning this resin film. The material of the optical waveguides (cores) 101a, 107a, the collimate lens 102a, the converging lens 106a, and the common optical waveguide 104 is not limited to the above epoxy resin and various materials may be employed. For instance, the fluorinated polyimide resin (OPI-N3205 (refractive index 1.52) manufactured by Hitachi Chemical Co., Ltd.) may be employed as the material of the optical waveguides (cores) 101a, 107a, the collimate lens 102a, the converging lens 106a, and the common optical waveguide 104.

Figure 9E:
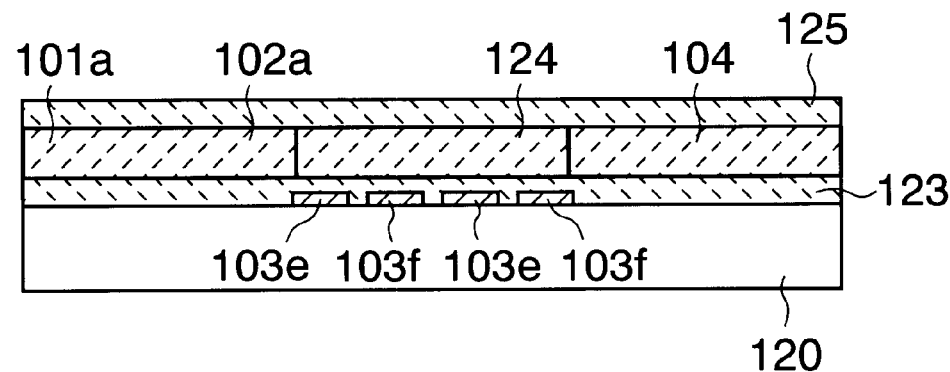

Then, as shown in FIG. 9E, an upper cladding layer 125 is formed by using the same resin as the lower cladding layer 123 to have a thickness of 5 μm or less. In this case, a low refractive index resin is filled to bury the clearances of the high refractive index resin in the collimate portion 102 and the converging portion 106 (portions 102d, 106d in FIG. 3). The clearances of the high refractive index resin may be filled with the air.

Figure 9F:
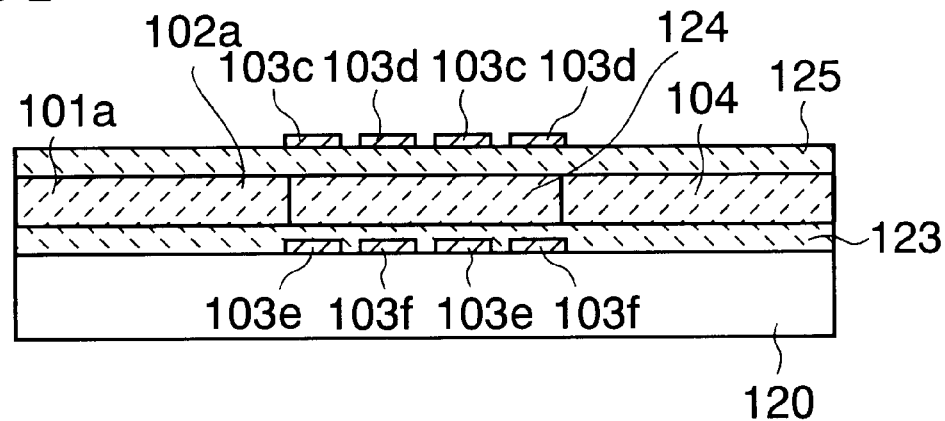
Figure 12:
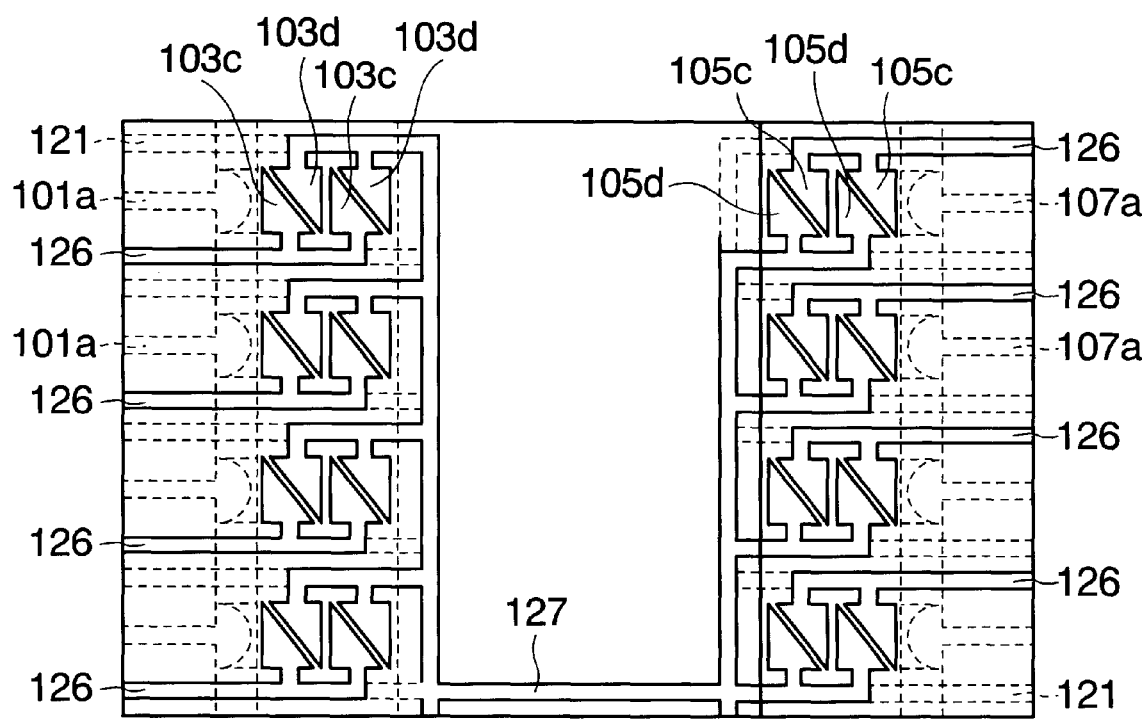
Figure 13:
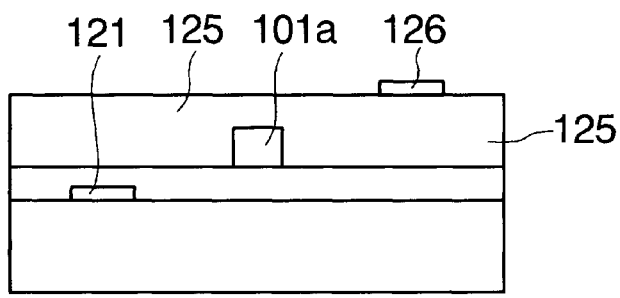
FIG. 13 is a side view showing one input port.

Then, as shown in FIG. 9F and FIG. 12, the first upper electrodes 103c, 105c and the second upper electrodes 103d, 105d are formed on the upper cladding layer 125. The first upper electrodes 103c, 105c are connected to the individual signal lines 126 every optical deflecting element, and the second upper electrodes 103d, 105d are connected commonly to the ground line 127. In this manner, the optical switch module according to the first embodiment can be manufactured.

The case where the polymer is employed as the waveguide material is explained as above. In this case, if the inorganic material such as quartz is employed as the waveguide material, the optical loss can be further reduced.

A change amount Δn of the refractive index of the electrooptic material by the Pokels effect is $\Delta n = -(½) rn^3 E$. Where r is the electrooptic constant, n is the refractive index, and E is the electric field strength.

FIG. 14 shows values of the deflection angle θ per one prism pair when $LiNbO_3$, PZT, and PLZT are employed as the slab waveguide. The calculations are made theoretically under the assumptions that an angle α of a top end portion of the electrode is 45 degree, the refractive indexes of $LiNbO_3$, PZT, and PLZT are 2.2, 2.4, and 2.4 respectively, the electrooptic constant r of $LiNbO_3$ is 30 pm/V, the electrooptic constant r of the PZT film formed by the sol-gel method is 50 pm/V, the electrooptic constant r of the PLZT sintered film is 612 pm/V, the electric field strength E applied to $LiNbO_3$ is 10 V/μm, the electric field strength E applied to the PZT film formed by the sol-gel method is 100 V/μm, and the electric field strength E applied to the PLZT sintered film is 8.2 V/μm.

As can be seen from FIG. 14, if $LiNbO_3$ is employed, the number of the prism pairs must be set to 63 or more to get the deflection angle of ±5 degree or more. In the case of PZT and PLZT, the number of the prism pairs must be set to 4 or more. Also, the optical loss is 1 dB/cm if $LiNbO_3$ is employed, the optical loss is 1.7 dB/cm if PZT is employed, and the optical loss is 0.7 dB/cm if PLZT is employed.

Figure 15:
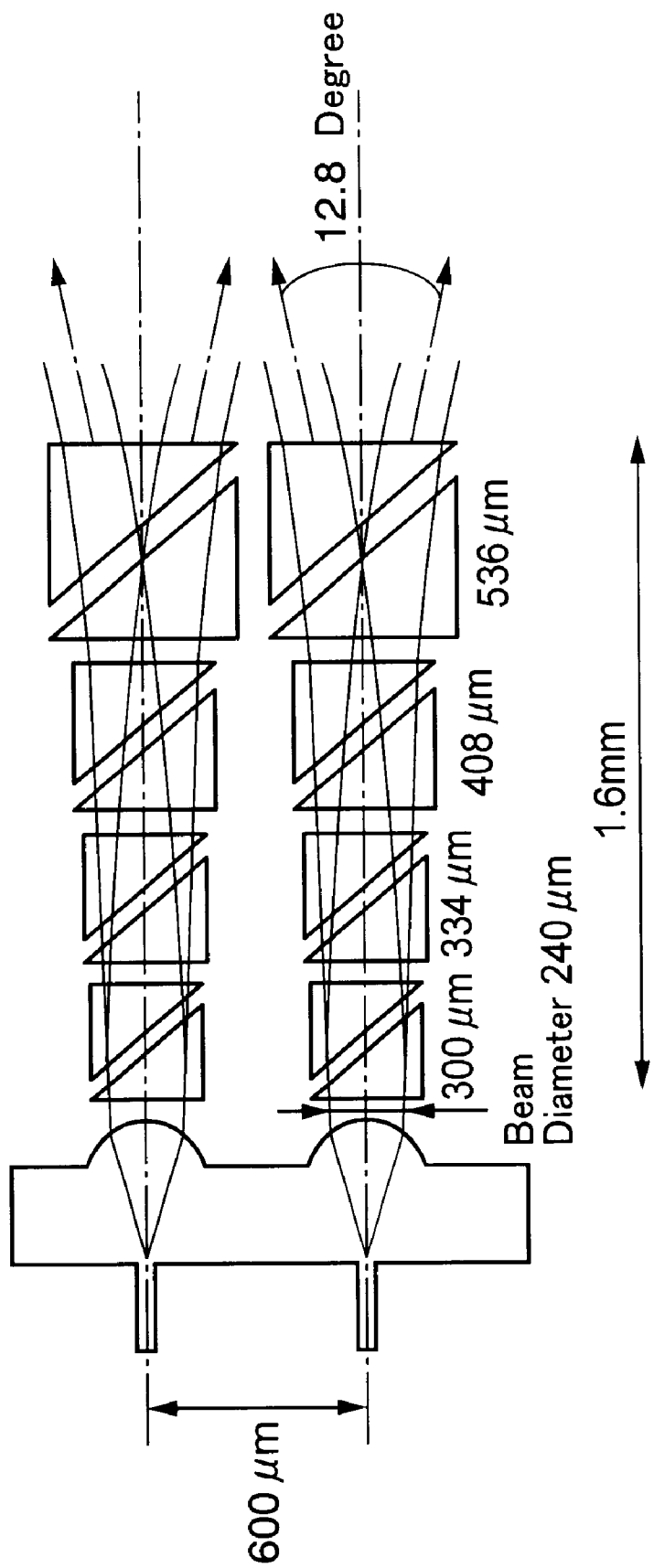
FIG. 15 is a schematic view showing sizes of respective prism pairs when the beam diameter of the light that is passed through the collimate lens is 240 $\mu$m.
Figure 16:
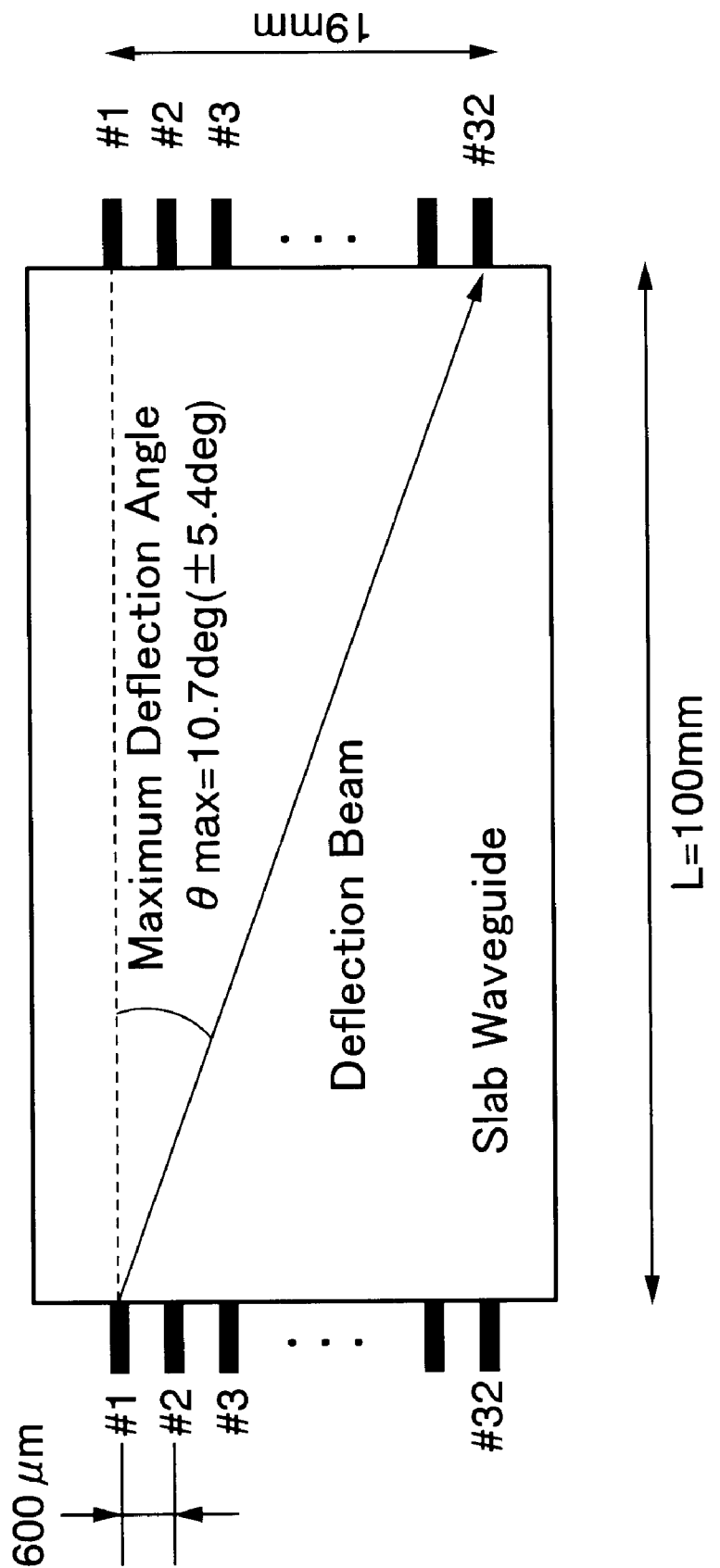
FIG. 16 is a schematic view showing an example of the size of the optical switch module of the present invention.

For instance, in the case that the prism pairs of the optical deflecting element are formed by using PLZT and the beam diameter of the light that is passed through the collimate lens is assumed as 240 μm, the light can be deflected in an angle range of 12.8 degree (±6.4 degree) if a size of the first prism pair is set to 300 μm, a size of the second prism pair is set to 334 μm, a size of the third prism pair is set to 408 μm, and a size of the fourth prism pair is set to 536 μm, as shown in FIG. 15. In the case of the 32×32-channel optical switch module, as shown in FIG. 16, if an optical waveguide pitch is 600 μm and the maximum deflection angle θ max by the optical deflecting element is set to 10.7 degree (almost ±5.4 degree), a width of the slab waveguide is 19 mm and a length is 100 mm. An overall size of the optical switch module including the incident side optical waveguide, the outgoing side optical waveguide, the collimate lens and the converging lens is almost 140×40 mm. In this manner, according to the first embodiment, the optical switch module that is smaller in size than the prior art can be achieved.

In FIG. 16, the incident side optical waveguides and the outgoing side optical waveguides are illustrated in parallel. In this case, all the incident side optical waveguides may be arranged such that they are slightly inclined mutually to the optical waveguides, that are arranged in the middle of the outgoing side optical waveguides, and also all the outgoing side optical waveguides may be arranged such that they are slightly inclined mutually to the optical waveguides, that are arranged in the middle of the incident side optical waveguides. Accordingly, the maximum deflection angle θ max of each optical deflecting element can be set identically (±5.4 degree).

Figure 17:
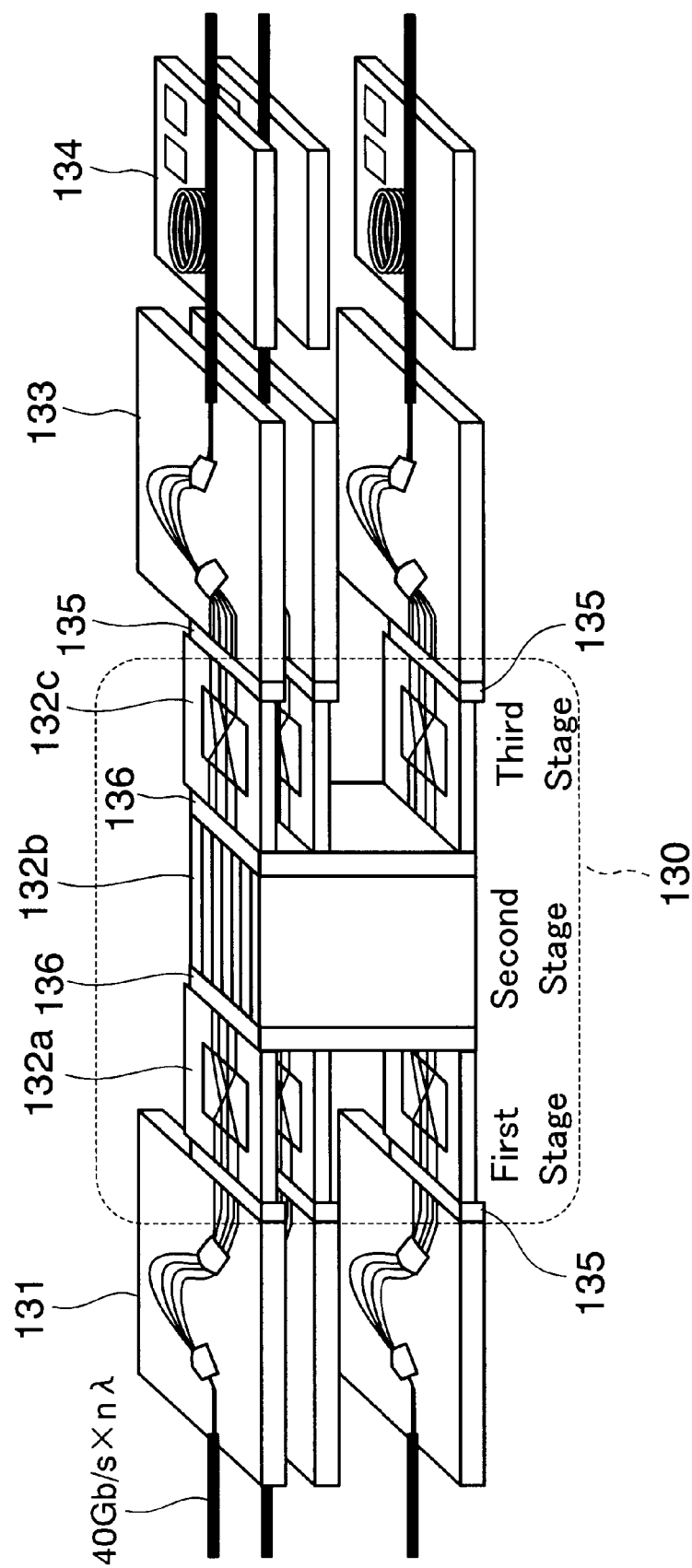
FIG. 17 is a schematic view showing a light signal switching device employing the optical switch module of the present invention.
Figure 18:
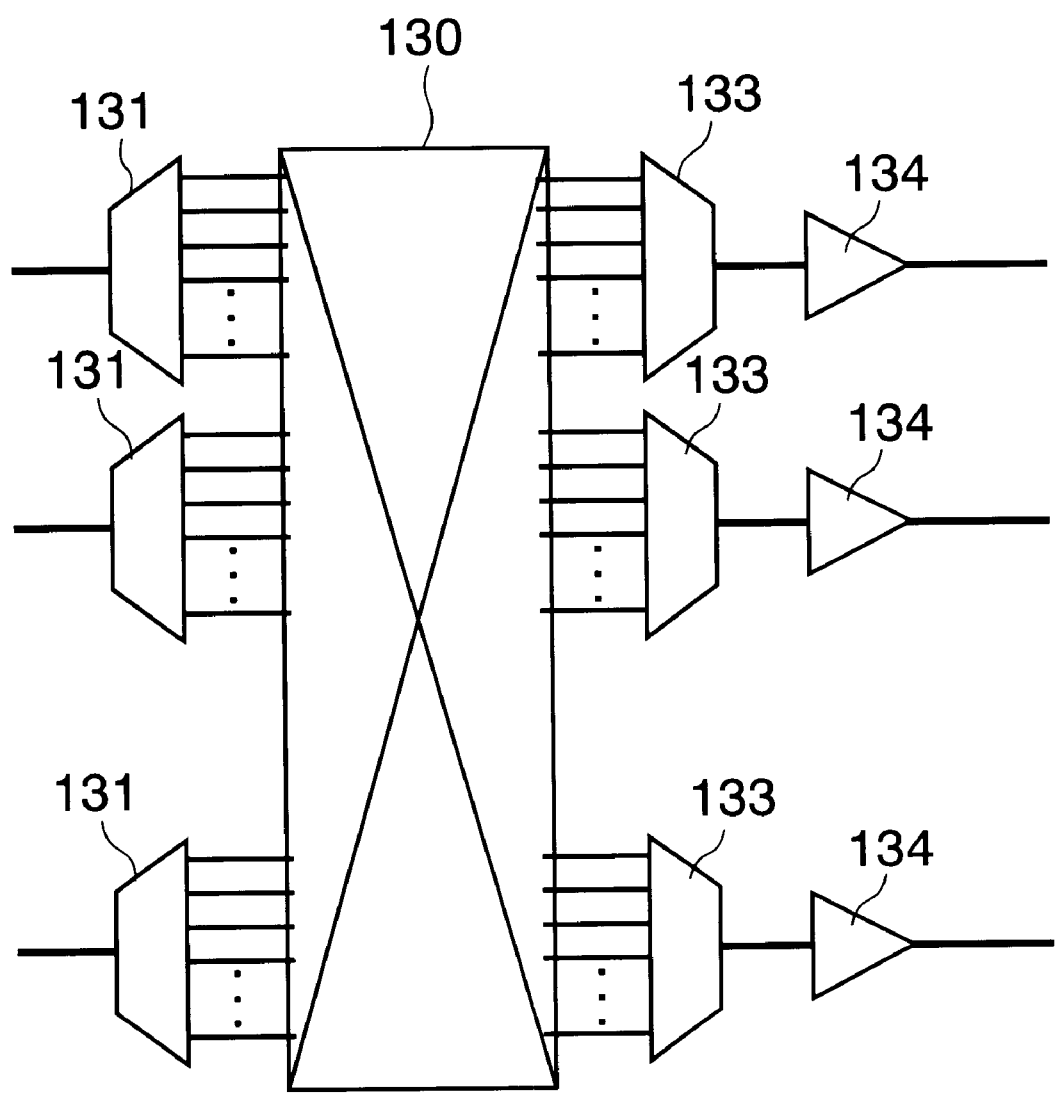
FIG. 18 is a block diagram showing the same.

FIG. 17 is a schematic view showing a light signal switching device employing the above optical switch module, and FIG. 18 is a block diagram showing the same. This light signal switching device receives the WDM signals, in which the light signals for 64 wavelengths are multiplied at 40 Gb/s, by 64 systems and then switches the propagation destination of these light signals.

The light signal switching device comprises 32 AWG optical branching filters 131 arranged in the vertical direction, an optical switch module group 130, 32 optical multiplexers 133, and 32 optical amplifiers (EDFAs: Erbium-Doped Fiber Amplifiers) 134. The optical switch module group 130 is constructed in a three-stage fashion. The optical switch module group in the first stage is constructed by 32 32×64-channel optical switch module 132a that are aligned in the vertical direction, the optical switch module group in the second stage is constructed by 64 32×32-channel optical switch module 132b that are aligned in the horizontal direction, and the optical switch module group in the third stage is constructed by 32 64×32-channel optical switch module 132c that are aligned in the vertical direction. In this case, the optical switch module group in the second stage is arranged in the state that it is rotated from the optical switch module groups in the first and third stages by 90 degree.

Figure 19A:
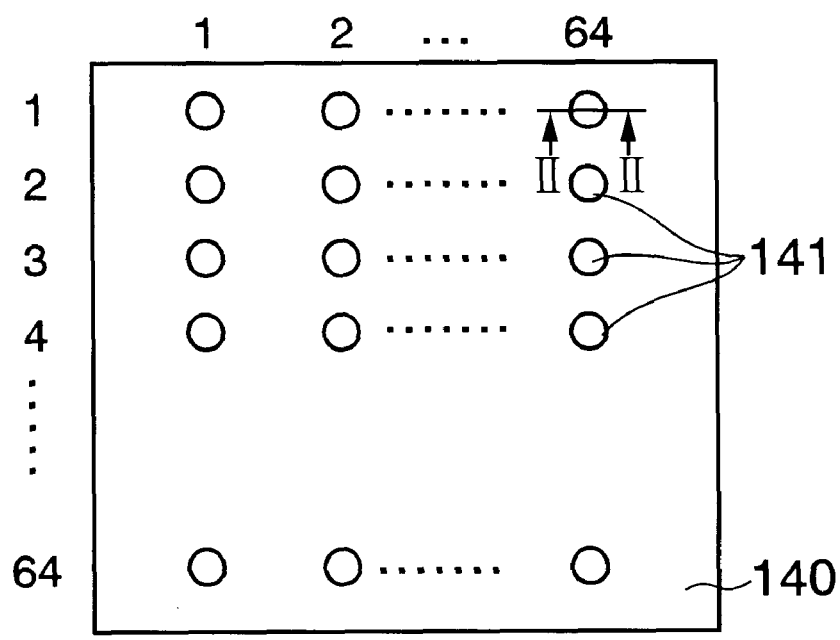
FIG. 19A is a plan view showing an example of an optical connector.

Also, the optical branching filters 131 and the optical switch module 132a in the first stage, the optical switch module 132a in the first stage and the optical switch module 132b in the second stage, the optical switch module 132b in the second stage and the optical switch module 132c in the third stage, and the optical switch module 132c in the third stage and the optical multiplexers 133 are connected via optical connectors 135, 136 respectively. As shown in a plan view of FIG. 19A and a sectional view of FIG. 19B taken along a II—II line in FIG. 19A, the optical connector 136 consists of a substrate 140, and a large number of minute lenses 141 that pass the light in the thickness direction of the substrate 140. As shown in FIG. 19A, lenses 141 are arranged in the two-dimensional direction in the optical connector 136, and the lenses 141 are arranged in the one-dimensional direction in the optical connector 135. In this case, an alignment pitch of the lenses 141 is set identically to an alignment pitch of the input/output ports of the optical switch module 132.

The lenses 141 of these optical connectors 135, 136 act to converge the light, which is output from the optical devices in the preceding stage, and transmit the light to the optical devices in the succeeding stage, and are useful to reduce the transmission loss.

In this light signal switching device, the multiplied light signal is separated into individual light signals by the optical branching filter 131. Then, the propagation destinations of respective light signals are switched by the optical switch module group 130. Here, the optical switch modules are constructed by the 32 32×64-channel optical switch module 132a, the 64 32×32-channel optical switch module 132b, and the 32 64×32-channel optical switch module 132c respectively, and the three-stage construction (cascade-connection) is built up by rotating three-set of optical switch module groups by 90 degree. Therefore, the light signal input into any input port can be output to any port of 1024 output ports. The light signals whose propagation destinations are switched by the light signal switching device are multiplexed by the optical multiplexer 133 every destination, and then amplified by optical amplifiers 134 to output.

Figure 19B:
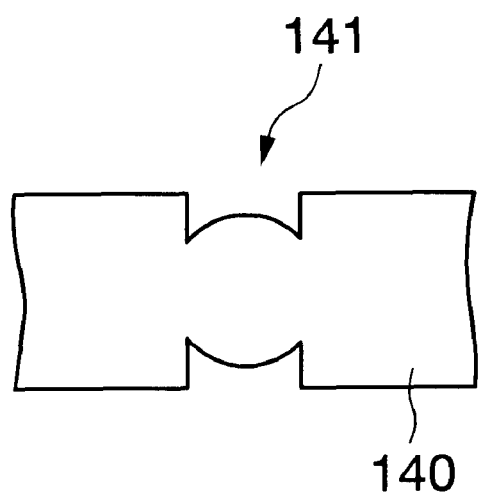
FIG. 19B is a sectional view taken along a II—II line in FIG. 19A.

In the light signal switching device of the first embodiment, since the optical branching filters 131 and the optical switch module group 130, the optical switch module group 130 and the optical multiplexers 133, and the optical switch modules 132a to 132c in the optical switch module group 130 are connected via the optical connectors shown in FIGS. 19A and 19B, the loss can be reduced. Also, in contrast to the case that these optical devices are connected via the optical fibers, a connecting operation is extremely easy and also a size of the device can be reduced considerably.

Figure 20:
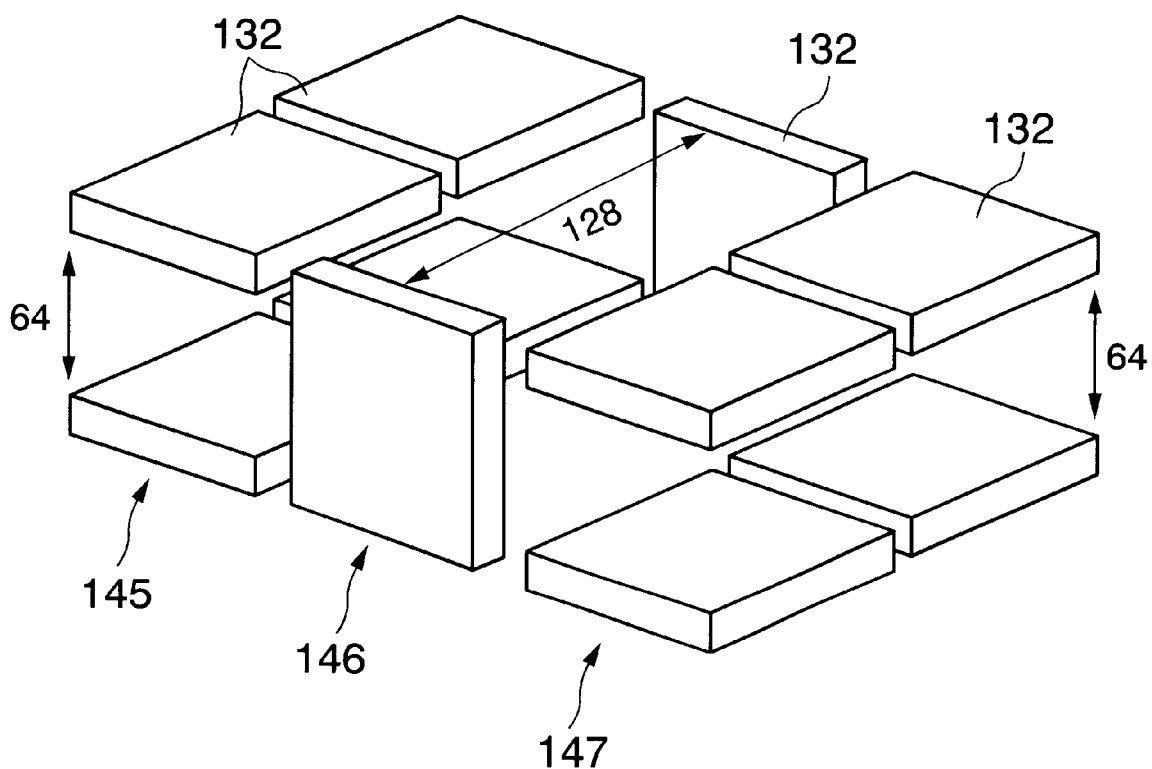
FIG. 20 is a schematic view showing another example of the light signal switching device employing the optical switch module of the present invention.

As shown in a schematic view of FIG. 20, first and third optical switch modules 145, 147 may be constructed by arranging 128 optical switch modules 132 in 2 columns in the width direction and in 64 columns in the height direction. A second optical switch module 146 may be constructed by 128 64×64-channel optical switch modules 132, which are aligned in the direction that is rotated from the optical switch modules 132 of the first and third optical switch modules 145, 147 by 90 degree.

Figure 21:
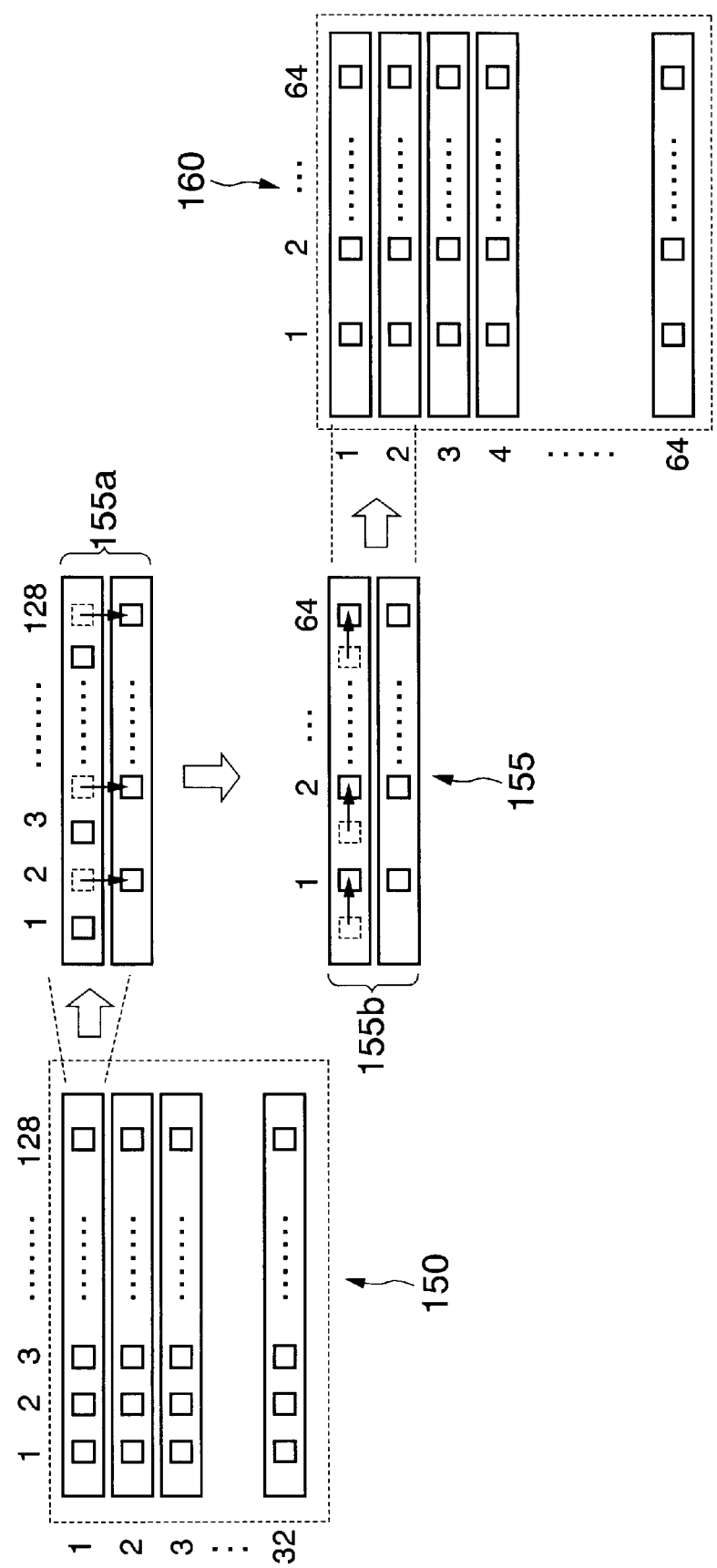
FIG. 21 is a schematic view showing an example of the optical connector when the 32-system light signal, in which the light signal having 128 wavelengths is multiplied, is input into an optical switch module group having input ports, which are arranged in 64 rows and 64 columns, from an optical branching filter group.
Figure 22A:
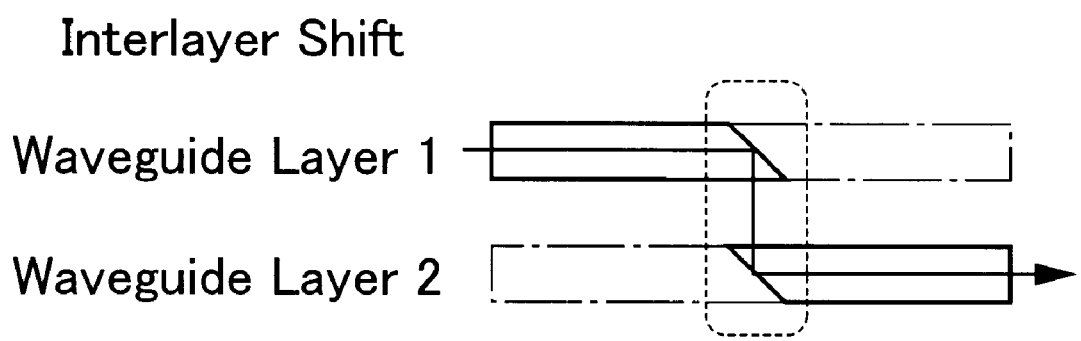
FIG. 22A is a schematic view showing an interlayer shifting portion of the optical connector.
Figure 22B:
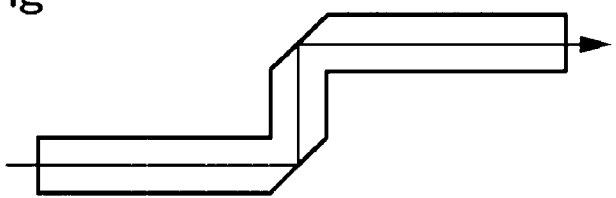
FIG. 22B is a schematic view showing an interlayer bending portion.

FIG. 21 is a schematic view showing an example of an optical connector 155 when the 32-system light signal, in which the light signal having 128 wavelengths is multiplied from the optical branch filter 150, is input into an optical switch module group 160 having the input ports that are arranged in 64 rows and 64 columns. This optical connector 155 consists of an interlayer shifting portion 155a that transmits the light signal from the optical waveguide layer on one surface side of the substrate to the optical waveguide layer on the other surface side or from the optical waveguide layer on the substrate to the optical waveguide layer on other substrate, and an interlayer bending portion 155b that changes the traveling direction of light in the same optical waveguide layer. That is, in the interlayer shifting portion 155a, the even-numbered light signals out of the 128 light signals, that are branched by the optical branching filter, are shifted to the direction perpendicular to the substrate surface by using the reflection mirror shown in FIG. 22A. Then, the interlayer bending portion 155b, the position of the output side optical waveguides are aligned to coincide with the input ports of the optical switch module group by bending the traveling direction of the light signal within the plane that is parallel with the substrate by virtue of the reflection mirror shown in FIG. 22B.

In this manner, the light signals can be input in the input ports of the optical switch module respectively.

In the above embodiment, the case where the deflection angle of the light signal is controlled by changing the voltage applied to the control electrodes of respective prism pairs is explained. In this case, the deflection angle of the light signal may be controlled by changing the number of the prism pairs to which the control voltage is applied while keeping the control voltage constant.

Second Embodiment

Figure 23:
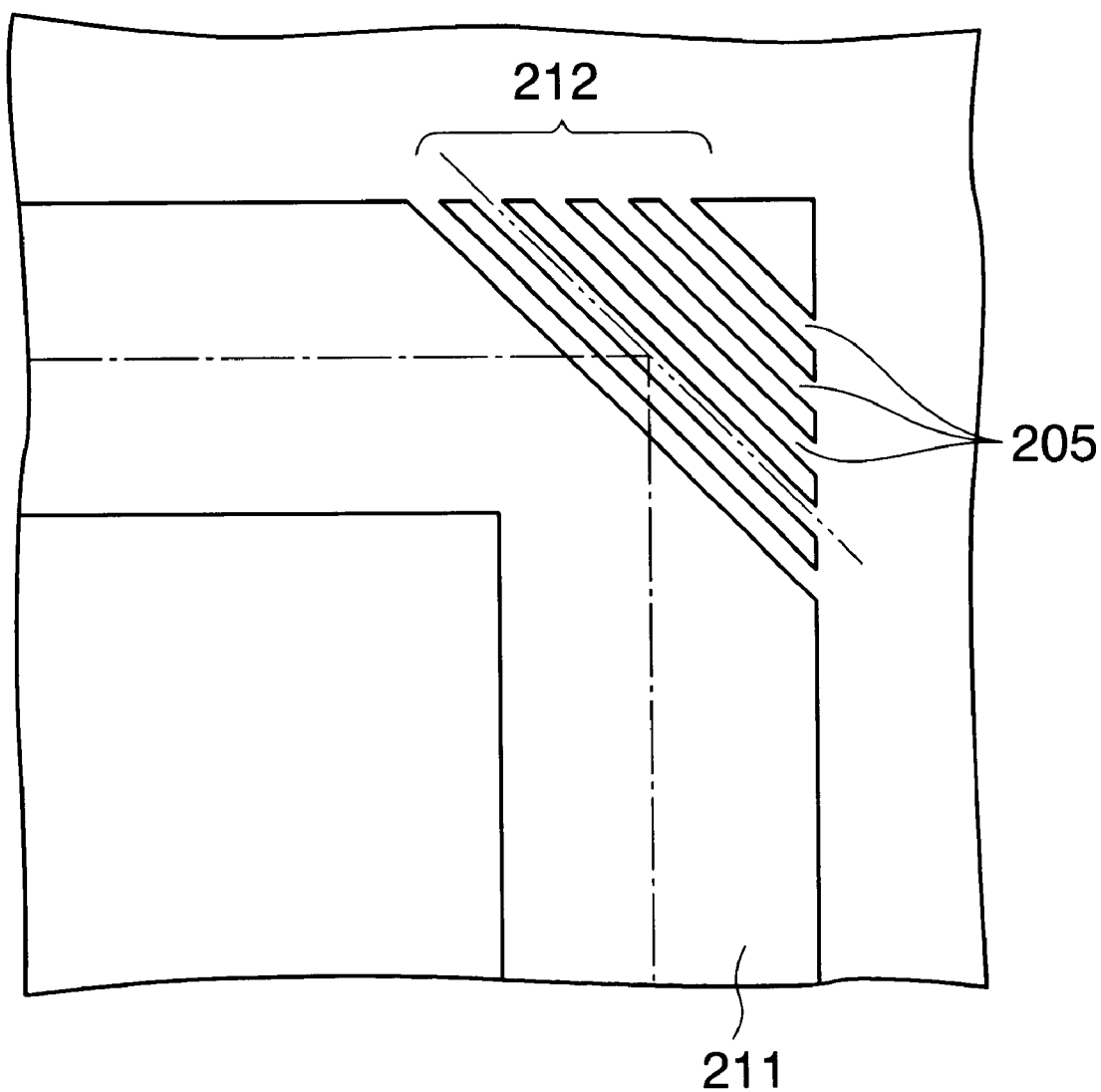
FIG. 23 is a top view showing an optical wiring substrate according to a second embodiment of the present invention.

FIG. 23 is a top view showing an optical wiring substrate according to a second embodiment of the present invention. In the second embodiment, an optical wiring substrate in which a dielectric multi-layered film mirror 212 is arranged at a bending portion of an optical waveguide 211, which is bent at a right angle, will be explained hereunder.

In the optical wiring substrate of the second embodiment, the dielectric multi-layered film mirror 212 is arranged at the bending portion of the optical waveguide 211 to have an angle of 45 degree to the center line (indicated by a dot-dash line in FIG. 23) of the optical waveguide 211. This dielectric multi-layered film mirror 212 is formed by providing a plurality of mutually-parallel slits 205 in a part of the optical waveguide 211. That is, this dielectric multi-layered film mirror 212 is constructed by forming a part of the optical waveguide 211 as the high refractive-index layer of the dielectric multi-layered film mirror 212 and using the air in the slits 205 as the low refractive-index layer of the dielectric multi-layered film mirror 212.

Also, the interface between the first high refractive-index layer and the low refractive-index layer of the dielectric multi-layered film mirror 212 is arranged on the front side rather than the theoretical reflection surface (indicated by a chain double-dashed line in FIG. 23) in which the intersection point of the center lines of the optical waveguide 211 is contained. That is, in the optical wiring substrate of the second embodiment, the theoretical reflection surface is contained in the dielectric multi-layered film mirror 212.

Figure 24:
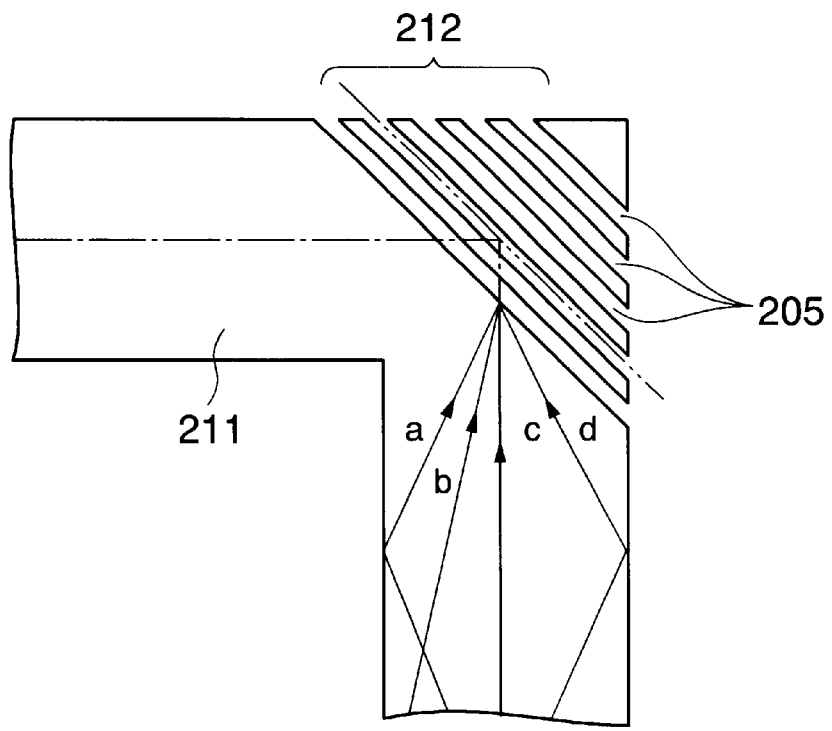
FIG. 24 is a schematic view showing an effect of the optical wiring substrate of the present invention.
Figure 26:
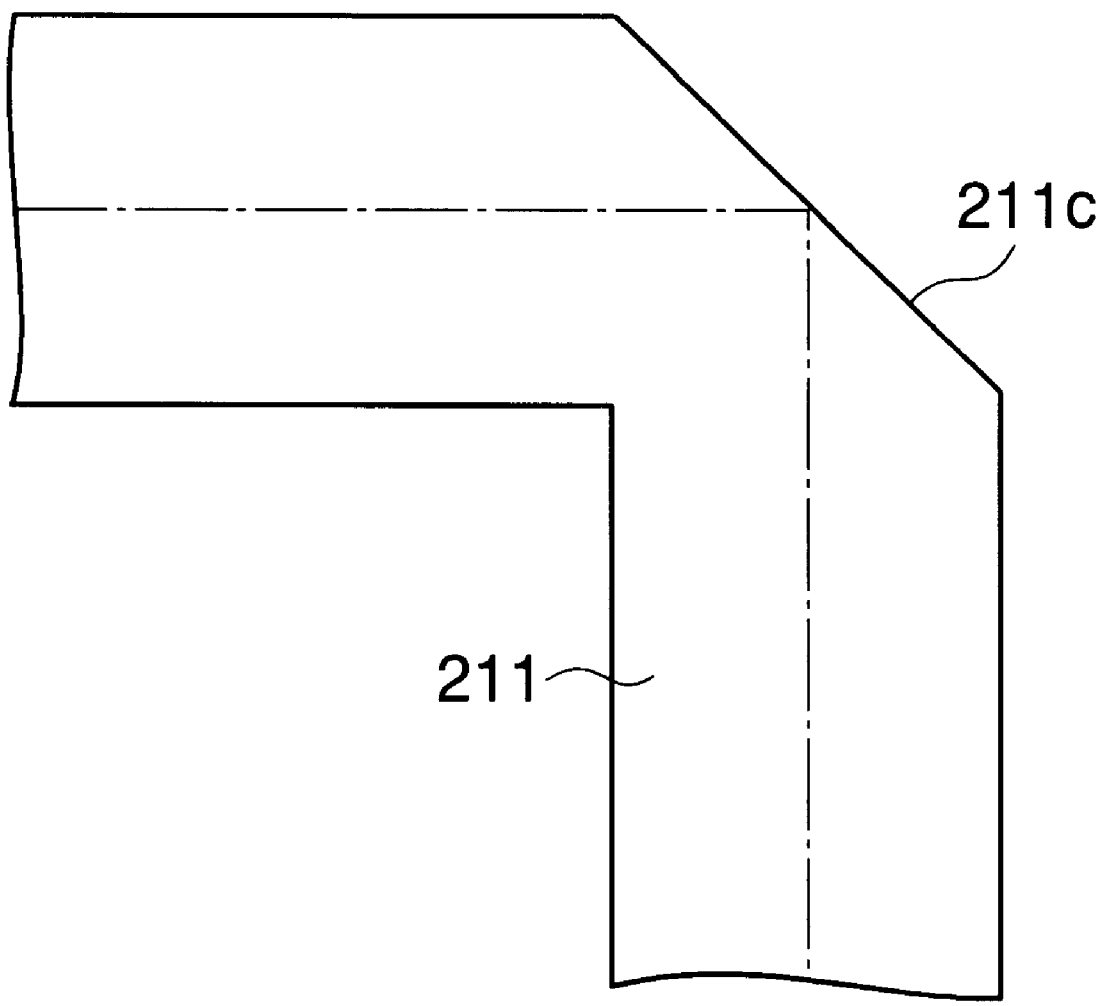
FIG. 26 is a schematic view showing the optical wiring substrate in which an interface between an optical waveguide and an air (or a cladding layer) is set as a reflection plane.

FIG. 24 is a schematic view showing an effect of the optical wiring substrate of the second embodiment. Like the second embodiment, in the case that the air is employed as the low refractive-index layer of the dielectric multi-layered film mirror 212, the light can be totally reflected at the interface between the first high refractive-index layer and the low refractive-index layer of the dielectric multi-layered film mirror 212 if the refractive index of the high refractive-index layer is more than 1.41 and also the light propagates in parallel with the center line of the optical waveguide (core) 211, so that there is no necessary that the dielectric multi-layered film mirror 212 should be formed as the multi-layered structure. For example, as shown in FIG. 26, it is possible to employ the interface 211c between the optical waveguide 211 and the air (cladding layer) as the reflection mirror. However, actually not only the light (indicated by an arrow c in FIG. 24) that propagates in parallel with the center line of the optical waveguide 211, but also the lights (indicated by arrows a, b, d in FIG. 24) that propagate in the optical waveguide 211 while reflecting on the interface between the optical waveguide 211 and the peripheral low refractive-index layer (the air in the second embodiment) is present.

As indicated by the arrows a, b in FIG. 24, it is highly possible that the light, that is incident upon the interface between the high refractive-index layer and the low refractive-index layer of the dielectric multi-layered film mirror 212 by a small angle to the normal line of the interface, is out of the total reflection conditions. Accordingly, in the optical waveguide shown in FIG. 26, the loss in the bending portion is increased. For this reason, if a periodic structure of the dielectric multi-layered film in the dielectric multi-layered film mirror 212 is set to optimize the lights that are out of the total reflection conditions, the transmission light of the dielectric multi-layered film mirror 212 can be further reduced and the loss in the bending portion of the optical waveguide becomes small rather than the prior art.

Figure 25:
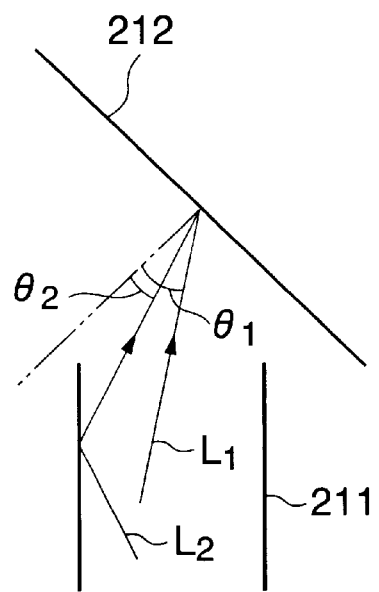
FIG. 25 is a schematic view showing an example of a method of optimizing a dielectric multi-layered film mirror in the optical wiring substrate of the present invention.

In this case, as shown in FIG. 25, it is preferable that the layer structure of the dielectric multi-layered film mirror 212 should be optimized for the light that is incident upon the dielectric multi-layered film mirror 212 at an angle ((θ1+θ2)/2) obtained by bisecting a sum of an angle θ1 of the light beam L1 and an angle θ2 of the light beam L2. Where this light beam L1 has the critical angle to the interface between the first low refractive-index layer and the high refractive-index layer of the dielectric multi-layered film mirror 212, and this light beam L2 of the light, that propagates while reflecting on the wall surface of the optical waveguide 211, has the smallest angle to the normal (indicated by a chain double-dashed line in FIG. 25) of the dielectric multi-layered film mirror 212.

In the second embodiment, the periodic structure is set such that the plane which is parallel with the reflection plane of the dielectric multi-layered film mirror 212 and contains the intersection point of the center lines of the bending portion of the optical waveguide can be contained in the dielectric multilayered film mirror 212, whereby the lights that are out of the total reflection conditions can be returned to the inside of the optical waveguide at the reflection plane of the optical waveguide. As a result, the loss can be reduced in the bending portion of the optical waveguide.

FIGS. 27A to 27F are perspective views showing a method of manufacturing the optical wiring substrate according to the second embodiment.

Figure 27A:
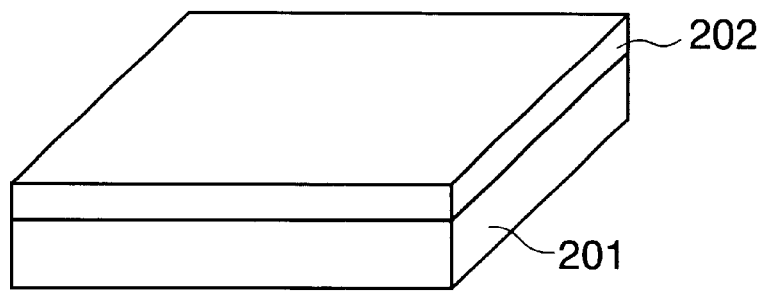
FIGS. 27A to 27F are perspective views showing a method of manufacturing the optical wiring substrate according to the second embodiment of the present invention.

First, as shown in FIG. 27A, a lower cladding layer 202 is formed on a silicon substrate 201 by spin-coating the resin that has the low refractive index, e.g., fluorinated polyimide resin OPI-N3205 (manufactured by Hitachi Chemical Co., Ltd.) whose refractive index is 1.52, to have a thickness of about 5 to 10 μm and then curing the resin by the heating.

Figure 27B:
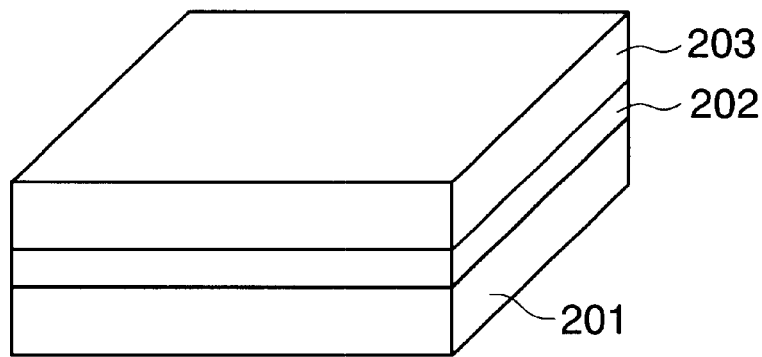

Then, as shown in FIG. 27B, a core layer 203 is formed by spin-coating the resin that has the refractive index higher than the lower cladding layer 202, e.g., fluorinated polyimide resin OPI-N3405 (manufactured by Hitachi Chemical Co., Ltd.) whose refractive index is 1.53, to have a thickness of about 10 μm and then curing the resin by the heating.

Figure 27C:
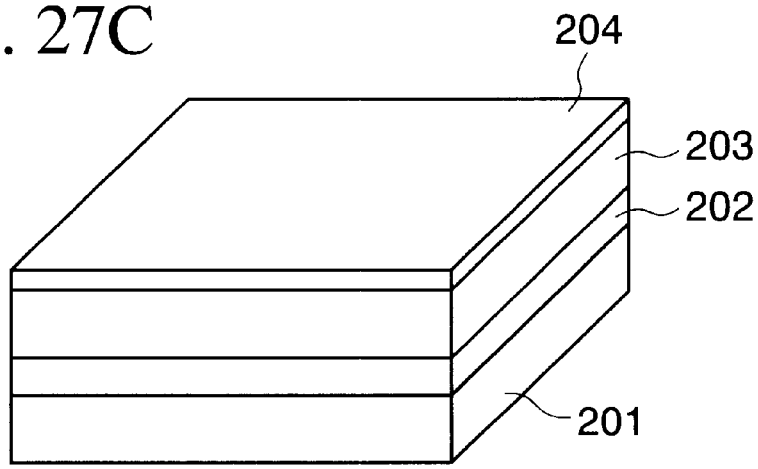

Then, as shown in FIG. 27C, a photoresist film 204 is formed by coating photoresist on the core layer 203. The photoresist that can be exposed by the ultraviolet rays and the electron beam and that has the resistance to the dry etching by using the oxygen plasma is employed. Then, the electron beam is irradiated onto the portion of the photoresist film 204, in which the low refractive-index layer (slits) of the dielectric multilayered film mirror 212 are formed, to expose there. At this time, as shown in FIG. 23, patterns of the low refractive-index layer are drawn such that the plane which is parallel with the reflection plane of the dielectric multi-layered film mirror 212 and contains the intersection point of the center lines of the optical waveguide 211 can be contained in the inside of the dielectric multilayered film mirror 212.

For example, in the case that the light enters into the dielectric multi-layered film mirror 212 at an angle of 45 and the optical waveguide 211 is formed of the fluorinated polyimide resin whose refractive index is 1.53, if the wavelength of the light passing through the optical waveguide 211 is assumed as 1.3 μm, a thickness of the high refractive-index layer must be set to about 0.15 μm, a thickness of the low refractive-index layer (a width of the slit 205) must be set to about 0.19 μm, and the number of the low refractive-index layer must be set to three layers or more.

Figure 27D:
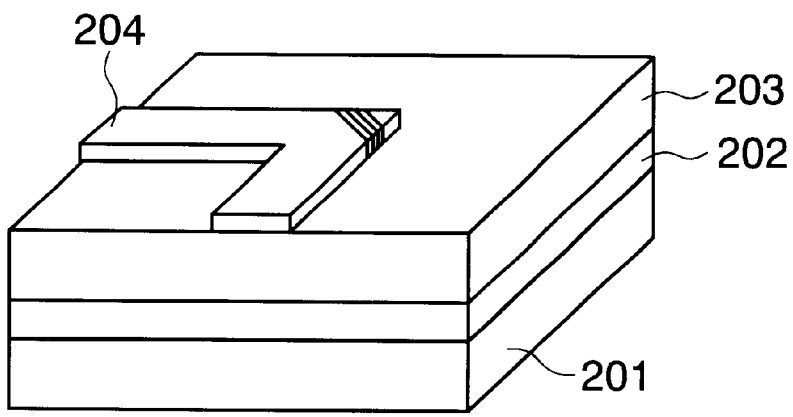

Then, the optical waveguide forming regions (containing the dielectric multi-layered film mirror forming regions) of the photoresist film 204 are masked and other portions are exposed by the ultraviolet rays (UV). Then, the photoresist film 204 is patterned as shown in FIG. 27D by executing the developing process.

Figure 27E:
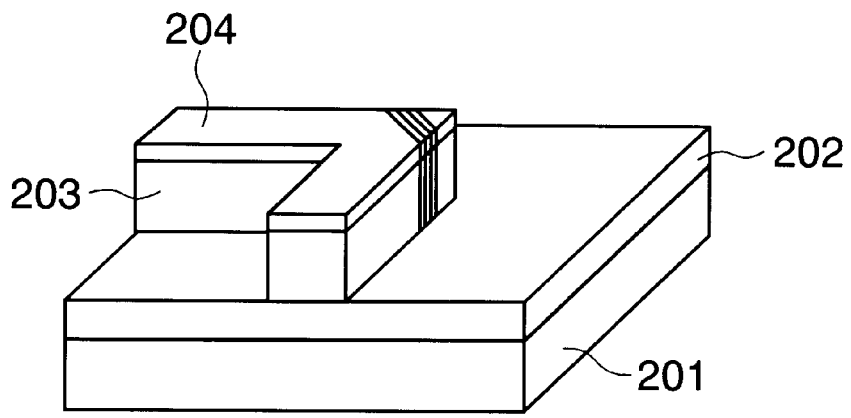
Figure 27F:
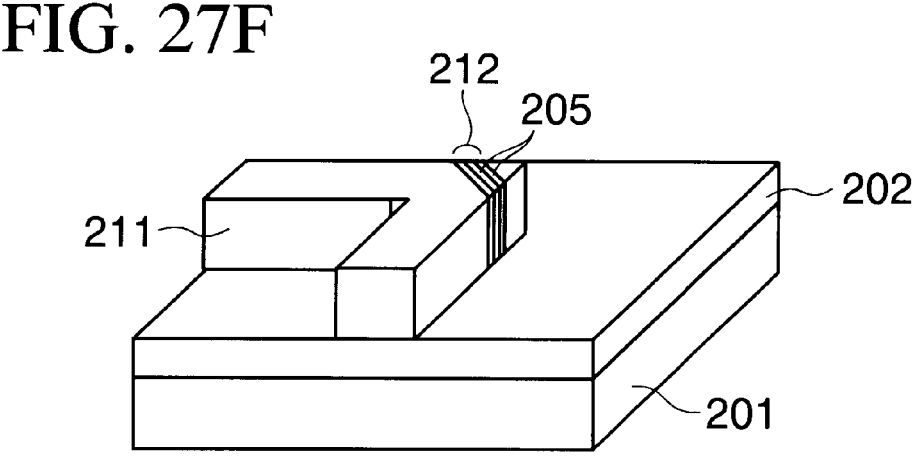
Figure 28:
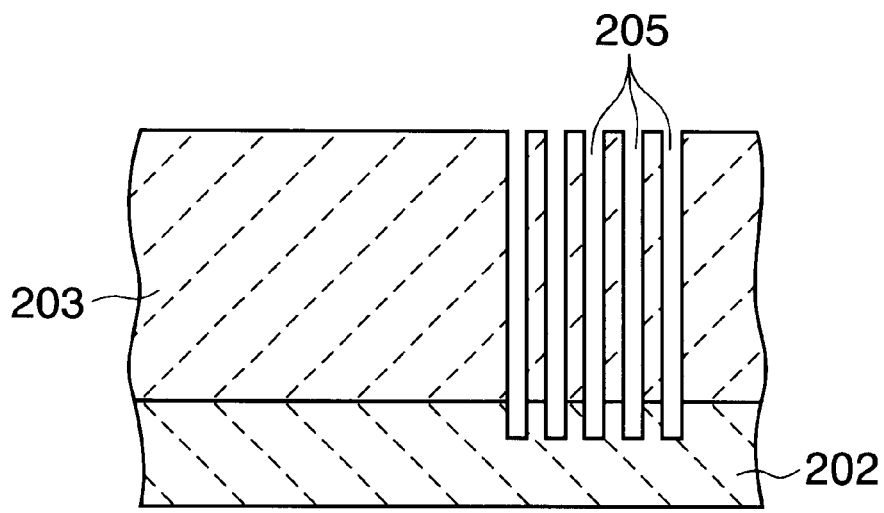
FIG. 28 is a sectional view showing a core layer at the time of the slit formation.

Then, as shown in FIG. 27E, an optical waveguide 211 is formed by dry-etching the core layer 203 by means of the oxygen plasma (300 W) while using the photoresist film 204 remaining on the core layer 203 as a mask. At this time, as shown in FIG. 28, the etching is continued until a lower end of the slit 205 serving as the low refractive-index layer of the dielectric multi-layered film mirror 212 reaches the lower cladding layer 202. Then, as shown in FIG. 27F, the photoresist film 204 is removed. In this manner, the optical wiring substrate of the second embodiment can be completed.

In the second embodiment, since the dielectric multi-layered film mirror 212 is constructed by forming a plurality of slits 205 on the optical waveguide 211, the mirror having the reflection plane perpendicular to the substrate 201 can be easily fabricated. Also, since the plane that is parallel with the reflection plane of the dielectric multi-layered film mirror 212 and contains the intersection point of the center lines of the optical waveguide 211 is positioned in the inside of the dielectric multilayered film mirror 212, it is possible to manufacture the optical wiring substrate that has the small loss in the bending portion of the optical waveguide 211.

Figure 29:
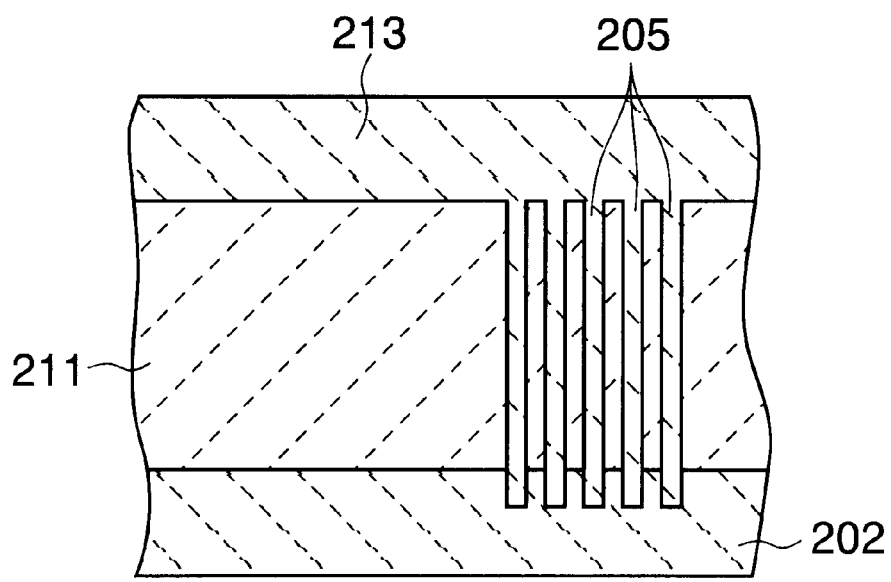
FIG. 29 is a sectional view showing an example in which resin having a low refractive index is coated around the optical waveguide.

In the above optical wiring substrate, the optical waveguide 211 is surrounded by the air. As shown in FIG. 29, an upper cladding layer 213 may be formed by coating the optical waveguide 211 with the material whose refractive index is lower than the optical waveguide (core) 211 (e.g., epoxy resin). In this case, it is preferable that the same low refractive-index material as the upper cladding layer 213 should be filled into the inside of the slits 205 that are formed as the low refractive-index layer of the dielectric multi-layered film mirror 212, as described above. Also, it is preferable that such filling of the low refractive-index material into the slits 205 should be carried out in vacuum not to remain the air in the slits 205.

Also, a reflection efficiency of the dielectric multi-layered film mirror 212 becomes higher as the refractive-index of the low refractive-index material filled into the slits 205 becomes lower. As the resin filled into the slits 205, the same material as the above lower cladding layer 202 may be employed. Preferably the material having the lower refractive index, e.g., fluorinated resin Cytop CTL-813A (refractive index 1.34: manufactured by ASAHI GLASS CO., LTD), should be employed.

For example, as shown in FIG. 27F, the optical waveguide (core) 211 having the slits 205 is formed, and then the fluorinated resin Cytop CTL-813A is coated on the substrate 201 in vacuum by the spin-coating method and then cured by the heating for one hour at the temperature of 180° C. In this manner, the optical wiring substrate in which the periphery of the optical waveguide (core) 211 is surrounded by the low refractive-index resin (upper cladding layer) can be manufactured. In this case, since the refractive index of the resin is higher than the air, the layer number of the low refractive-index layer (slits 205) of the dielectric multi-layered film mirror 212 must be set to 20 or more.

Figure 30:
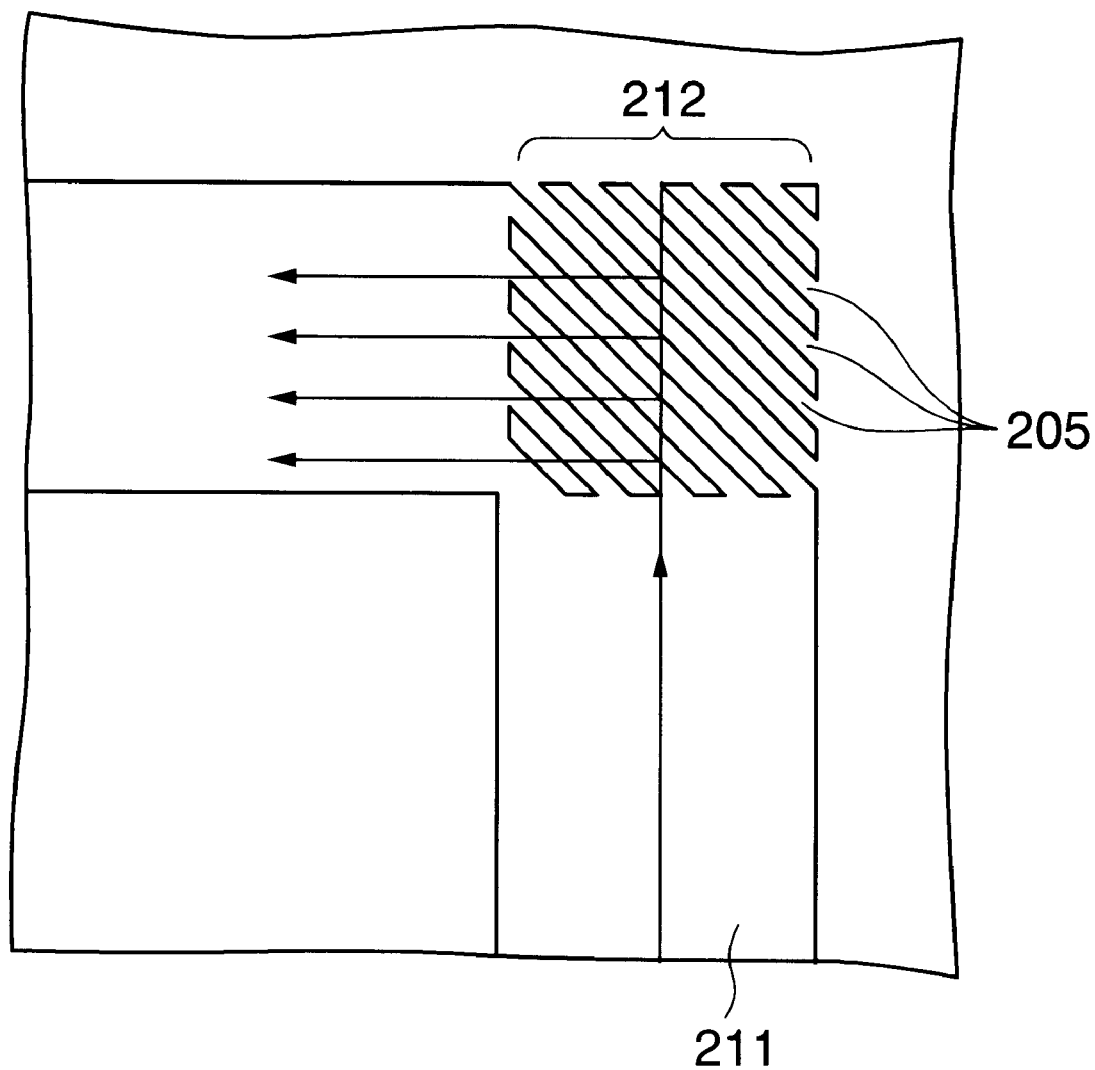
FIG. 30 is a top view showing a variation of the optical wiring substrate according to the second embodiment.

A variation of the second embodiment is shown in FIG. 30. The light is multiply-reflected by respective layers of the dielectric multi-layered film. It will be lost if such light does not enter in the inside of the optical waveguide. Therefore, as shown in FIG. 30, if the slits 205 are formed in the overall bending portion of the optical waveguide 211, the loss in the dielectric multi-layered film mirror 212 can be suppressed to the lowest minimum.

Third Embodiment

Figure 31A:
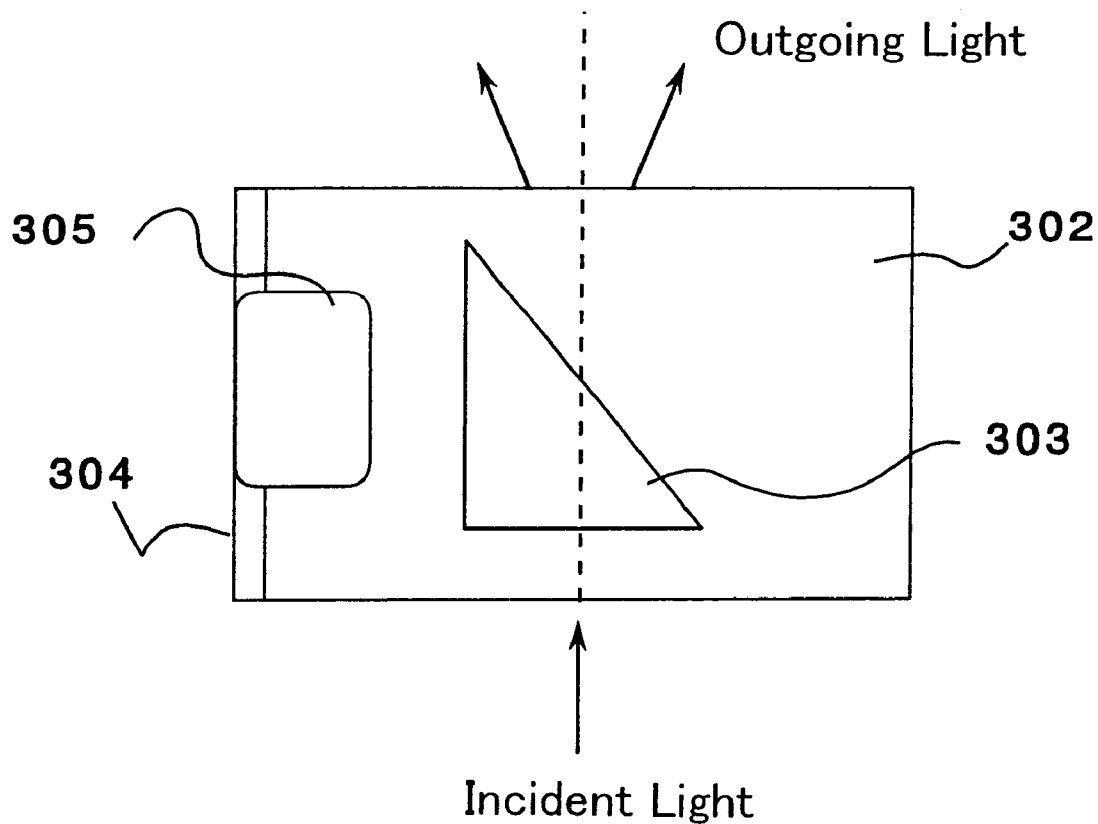
FIG. 31A is a plan view showing a structure of an optical deflecting element according to a third embodiment of the present invention.
Figure 31B:
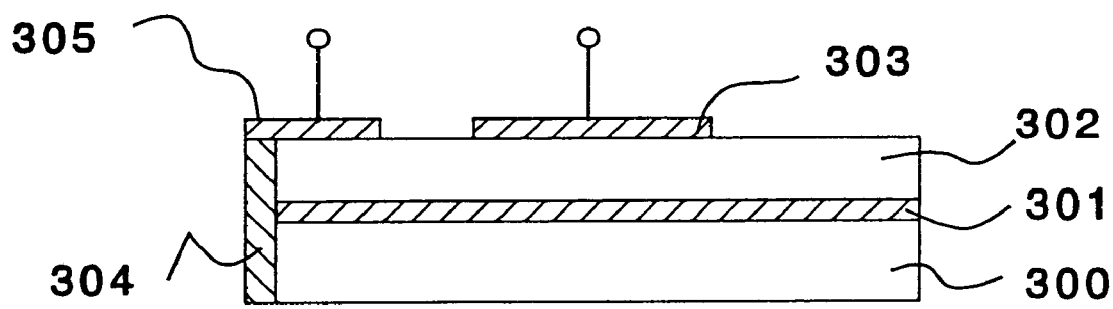
FIG. 31B is a sectional view showing the same.

FIG. 31A is a plan view showing a structure of an optical deflecting element according to a third embodiment of the present invention, and FIG. 31B is a sectional view showing the same.

Figure 32:
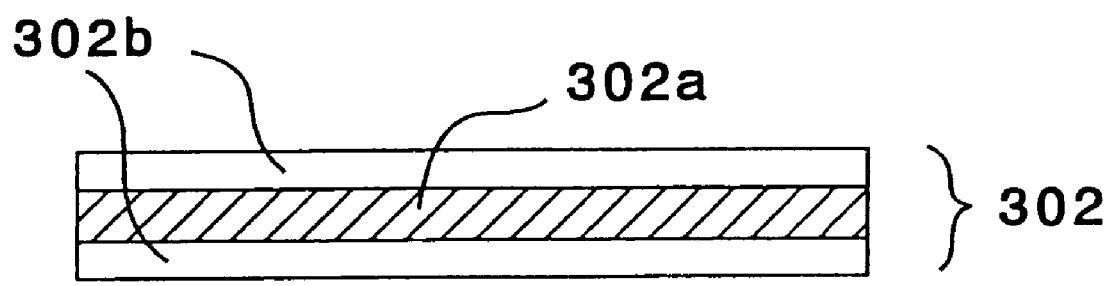
FIG. 32 is a sectional view showing a structure of the optical waveguide.

A lower electrode (first electrode) 301 made of conductive material such as the metal is formed on a single crystal substrate 300, and an optical waveguide 302 that is constructed by the crystal having the electrooptic effect is arranged on the lower electrode 301. For example, as shown in FIG. 32, the optical waveguide 302 has such a structure that a core layer 302a is put between upper and lower cladding layers 302b to confine the light in the core layer 302a due to the difference in the refractive index between the core layer 302a and the cladding layers 302b. Also, the optical waveguide 302 may have the structure in which the light can be confined in the center portion of the optical waveguide 302 by changing the refractive index continuously.

The core layer 302a of the optical waveguide 302 must be formed of the crystal having the electrooptic effect, but the cladding layers 302b do not always need the electrooptic effect.

An upper electrode (second electrode) 303 and a leading electrode 305 are formed on the optical waveguide 302. The upper electrode 303 is formed as a wedge shape (right triangular shape) having a side that intersects orthogonally with the optical axis of the incident light (base) and a side that intersects obliquely with the optical axis (oblique side). Also, the leading electrode 305 is connected electrically to the lower electrode 301 via a conductive film 304 on a side surface of the optical deflecting element.

In the optical deflecting element constructed in this manner, as shown in FIG. 31A, the light comes into the optical waveguide 302 from the base side of the upper electrode 303 and then goes out from the oblique side. If the voltage is applied between the upper electrode 303 and the leading electrode 305, the refractive index of the portion of the optical waveguide 302 under the upper electrode 303 is changed to cause the difference in the refractive index between such portion and the periphery. The light passing through the optical waveguide 302 is deflected at the portion whose refractive index is changed and the traveling direction of light is changed. That is, the outgoing direction of light can be controlled by changing the voltage that is applied between the upper electrode 303 and the leading electrode 305.

In the optical deflecting element of the third embodiment, since the lower electrode 301 is formed on the single crystal substrate 300 and the optical waveguide 302 is formed on the lower electrode 301, the conductivity or semi-conductivity is not required for the single crystal substrate 300. Therefore, the manufacture of the substrate 300 becomes easy and also the production cost can be reduced.

Also, the optical deflecting element of the third embodiment, since the leading electrode 305 electrically connected to the lower electrode 301 is arranged on the plane on which the upper electrode 303 is arranged, the mounting of the element onto other substrate (optical switch module substrate) can be made easy. In other words, when the optical deflecting element is to be mounted onto the optical switch module substrate, only the connection of the upper electrode 303 and the leading electrode 305 to the optical switch module substrate by the solder, etc. is required. Thus, the step of electrically connecting the lower electrode and the optical switch module substrate after the optical deflecting element is mounted onto the optical switch module substrate can be eliminated.

FIGS. 33A to 33D are sectional views showing a method of manufacturing the optical deflecting element according to the third embodiment in order of steps.

In the third embodiment, an example in which PZT material is employed as the crystal material having the electrooptic effect will be explained hereunder. In this case, it is preferable that the substrate suitable for the PZT crystal growth should be selected as the substrate 300. In the third embodiment, STO (SrTiO$_3$) single crystal substrate is employed as the substrate 300 since the crystal constant is close to PZT.

Figure 33A:
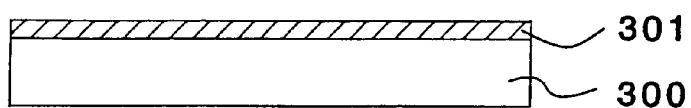
FIGS. 33A to 33D are sectional views showing a method of manufacturing the optical deflecting element according to the third embodiment of the present invention in order of steps.

First, as shown in FIG. 33A, the lower electrode 301 of about 2000 Å is formed by epitaxially growing SRO (SrRuO$_3$) or Pt (platinum) on the STO single crystal substrate 300 by the well-known film forming method such as the sol-gel method, the PLD (Pulsed Laser Deposition) method, the sputter method, the CVD method, or the like.

In this case, the case where the thickness of the lower electrode 301 is below 1000 Å is not preferable since the resistance value is increased. The resistance value can be reduced if the thickness of the lower electrode 301 is increased, but the crystallinity of the optical waveguide 302 formed on the lower electrode 301 is degraded. For this reason, it is preferable that, as described above, the thickness of the lower electrode 301 should be set to about 2000 Å.

Figure 33B:
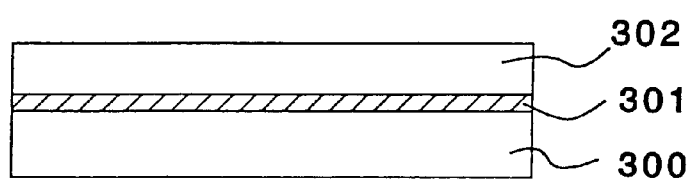

Then, as shown in FIG. 33B, the optical waveguide 302 is formed on the lower electrode 301 by epitaxially growing PLZT (cladding layer)/PZT (core layer)/PLZT (cladding layer) sequentially. A thickness of the optical waveguide 302 is set to almost 1 to 10 µm, for example.

Then, side surfaces (the light incident plane, the light outgoing plane, and other planes) of the structure consisting of the substrate 300, the lower electrode 301, and the optical waveguide 302 are polished to planarize sufficiently and to expose the lower electrode 301 from the side surface.

Figure 33C:
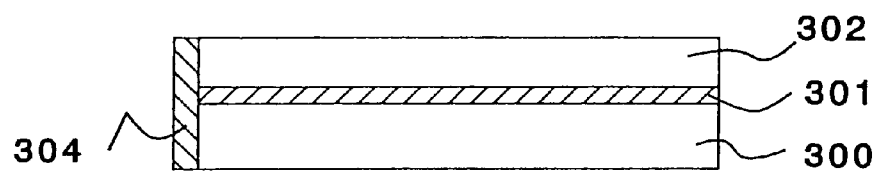

Then, as shown in FIG. 33C, the conductive film 304 having a thickness of about 2000 Å or more is formed by depositing Pt on one side surface (except the light incident plane and the light outgoing plane) of the structure by virtue of the sputter method, etc., for example. The lower electrode 301 is connected electrically to this conductive film 304 via the portion exposed from the side surface.

Figure 33D:
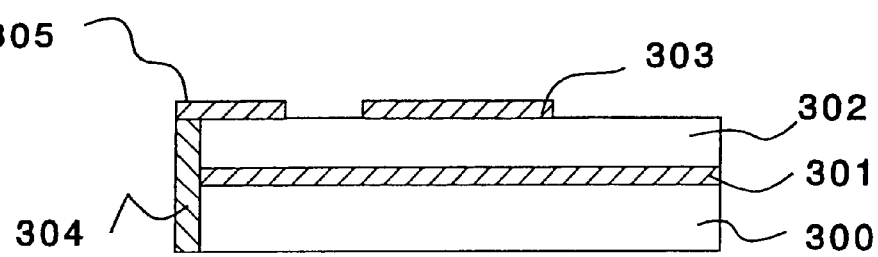

Then, as shown in FIG. 33D, the conductive film made of Pt, or the like and having a thickness of about 2000 Å or more is formed on the optical waveguide 302 by virtue of the sputter method, etc., for example. Then, the upper electrode 303 of the wedge shape (right triangular shape) and the leading electrode 305, which is connected electrically to the lower electrode 301 via the conductive film 304, are formed by patterning this conductive film by virtue of the photolithography method. As a result, the optical deflecting element of the third embodiment can be completed.

In the third embodiment, since the lower electrode 301 is formed on the substrate 300, it is not needed that the substrate 300 is conductive. Therefore, the substrate that is suitable for the formation of the optical waveguide 302 can be selected as the substrate 300 regardless of the conductivity. As a result, the optical deflecting element that is excellent in the crystallinity, has the small optical loss, and has good optical properties can be obtained.

Also, since the optical deflecting element of the third embodiment employs the conductive material such as the metal having the small electric resistance as the lower electrode 301, it is possible to execute the high-speed operation.

In addition, since the upper electrode 303 and the leading electrode 305 are formed on the same plane, the optical deflecting element of the third embodiment can be easily mounted on other substrate.

Fourth Embodiment

Figure 34A:
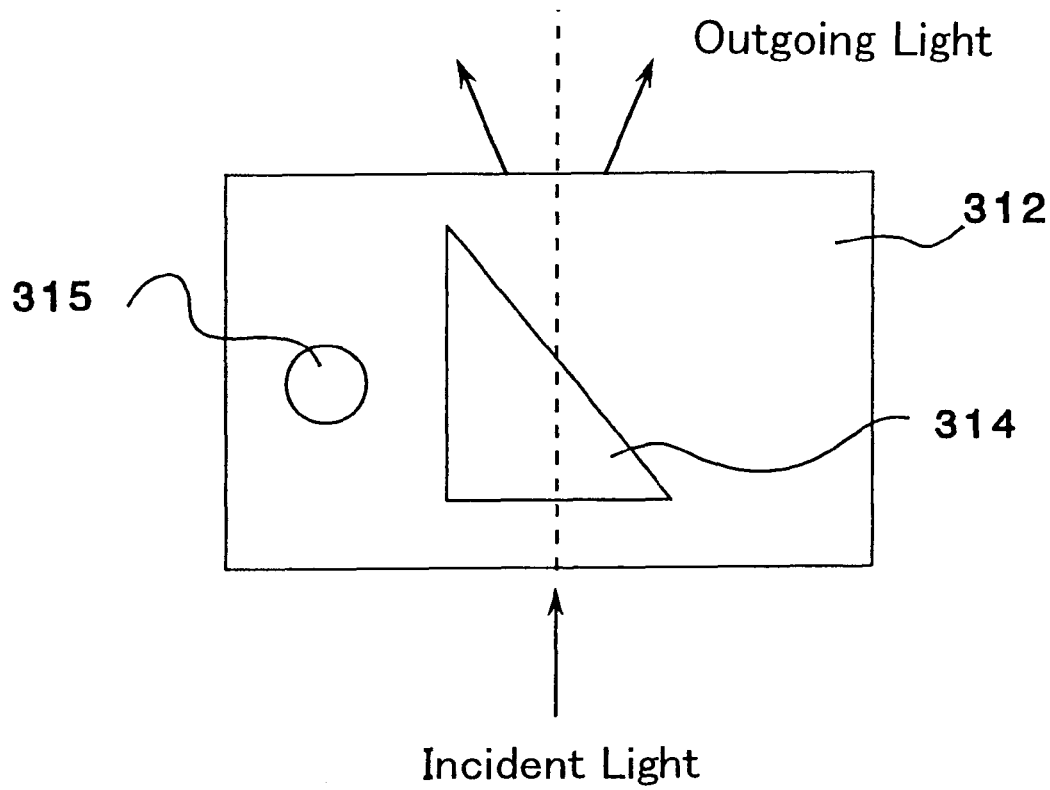
FIG. 34A is a plan view showing a structure of an optical deflecting element according to a fourth embodiment of the present invention.
Figure 34B:
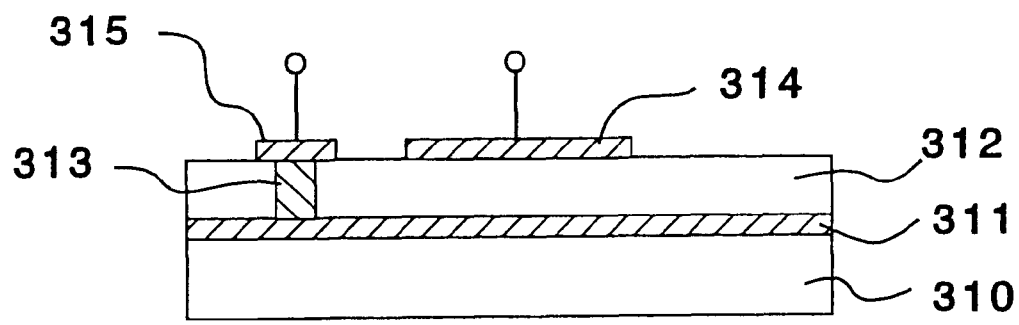
FIG. 34B is a sectional view showing the same.

FIG. 34A is a plan view showing a structure of an optical deflecting element according to a fourth embodiment of the present invention, and FIG. 34B is a sectional view showing the same.

A lower electrode 311 made of conductive material such as the metal is formed on a single crystal substrate 310, and an optical waveguide 312 having a laminated structure of cladding layer/core layer/cladding layer, as shown in FIG. 32, for example, is formed on this lower electrode 311. Also, an upper electrode 314 of the wedge shape (right triangular shape) having the side that intersects orthogonally with the optical axis of the incident light (base) and the side that intersects obliquely with the optical axis (oblique side) and a circular leading electrode 315 are formed on the optical waveguide 312. The leading electrode 315 is connected electrically to the lower electrode 311 via the column-like conductor 313 that pass through vertically the optical waveguide 312.

As shown in FIG. 34A, the light enters into the optical waveguide from the base side of the upper electrode 314 and then goes out from the oblique side. If the voltage is applied between the upper electrode 314 and the leading electrode 315, the refractive index of the portion of the optical waveguide 312 under the upper electrode 314 is changed to cause the difference in the refractive index between the portion and the periphery. The light passing through the optical waveguide 312 is deflected at the portion whose refractive index is changed and the traveling direction of light is changed. That is, the outgoing direction of light can be controlled by changing the voltage that is applied between the upper electrode 314 and the leading electrode 315.

FIGS. 35A to 35E are sectional views showing a method of manufacturing the optical deflecting element according to the fourth embodiment in order of steps.

Figure 35A:
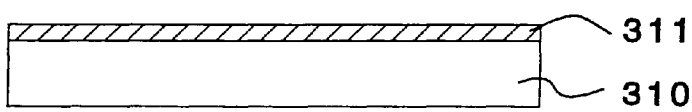
FIGS. 35A to 35E are sectional views showing a method of manufacturing the optical deflecting element according to the fourth embodiment of the present invention in order of steps.

First, as shown in FIG. 35A, the lower electrode 311 of about 2000 Å thickness is formed on the STO single crystal substrate 310 by epitaxially growing SRO or Pt.

Figure 35B:
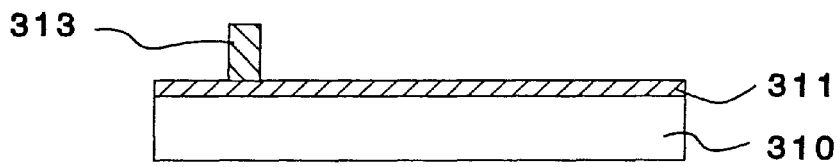

Then, as shown in FIG. 35B, a Cu (copper) film, for example, is formed on the lower electrode 311 by the sputter method. Then, the column-like conductor 313 is formed by patterning the Cu film by virtue of the photoresist method. A height of this column-like conductor 313 (height of the Cu film) must be set to exceed the thickness of the optical waveguide 312 that is formed subsequently.

Figure 35C:
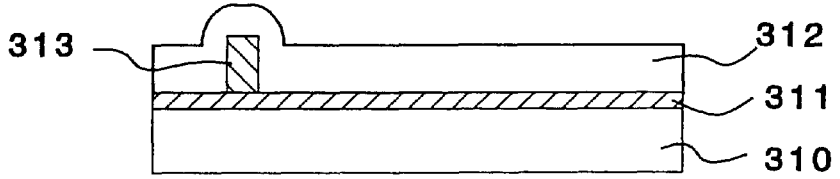

Then, as shown in FIG. 35C, the optical waveguide 312 of about 1 to 10 µm thickness is formed by epitaxially growing PLZT (cladding layer)/PZT (core layer)/PLZT (cladding layer) sequentially on the lower electrode 311. In this case, it may be guessed that the disturbance of the crystal structure is generated near the column-like conductor 313. However, since the neighboring area of the column-like conductor 313 is not the portion through which the light is actually passed, there is no possibility that such disturbance interferes with the operation of the optical deflecting element.

Figure 35D:
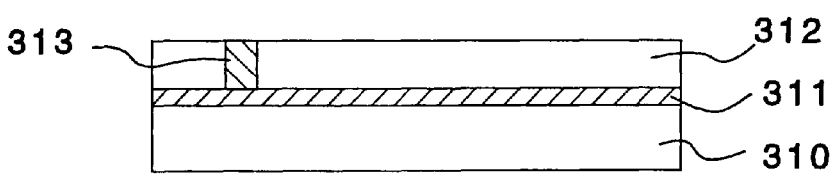

Then, as shown in FIG. 35D, a surface of the optical waveguide 312 is polished to planarize and to expose the column-like conductor 313.

Figure 35E:
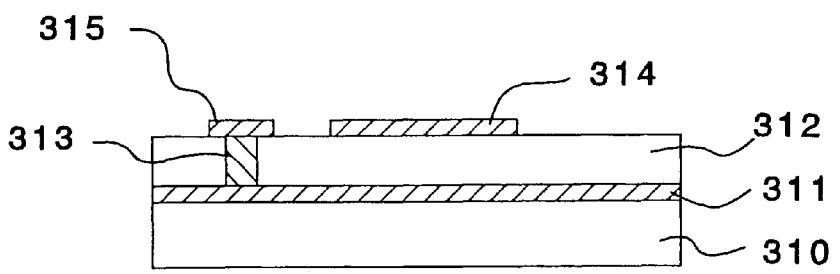

Then, as shown in FIG. 35E, the conductive film of about 2000 Å thickness is formed on the optical waveguide 312 by depositing Pt, for example. Then, the upper electrode 314 of the wedge shape and the leading electrode 315, which is connected electrically to the lower electrode 311 via the column-like conductor 313, are formed by patterning this conductive film by virtue of the photolithography method. As a result, the optical deflecting element of the fourth embodiment can be completed.

The optical deflecting element of the fourth embodiment has such an advantage that the mass productivity is excellent, in addition to the same advantages of the third embodiment. That is, if the optical deflecting elements as shown in FIGS. 31A and 31B and FIGS. 34A and 34B are manufactured, it may be considered that a number of optical deflecting elements are formed simultaneously on a sheet of substrate and then individual optical deflecting elements are obtained by dividing the substrate near the final step. However, in the optical deflecting element shown in FIGS. 31A and 31B, for convenience of the electrical connection between the lower electrode 301 and the leading electrode 305 via the conductive film 304 formed on the side surface, the conductive film 304 cannot be formed even after the substrate is divided.

In contrast, the optical deflecting element of the fourth embodiment, the column-like conductor 313 for connecting the lower electrode 311 and the leading electrode 315 is formed by forming the Cu film on the overall upper surface of the lower electrode 311 and then patterning this Cu film by the photolithography method. Therefore, the column-like conductor 313 can be formed before the substrate is divided, and thus the production efficiency can be increased.

In the third and fourth embodiments, the case where one lower electrode and one upper electrode are formed on one substrate respectively is explained. One or plural prism pairs explained in the first embodiment may be formed on one substrate.

Fifth Embodiment

Figure 36A:
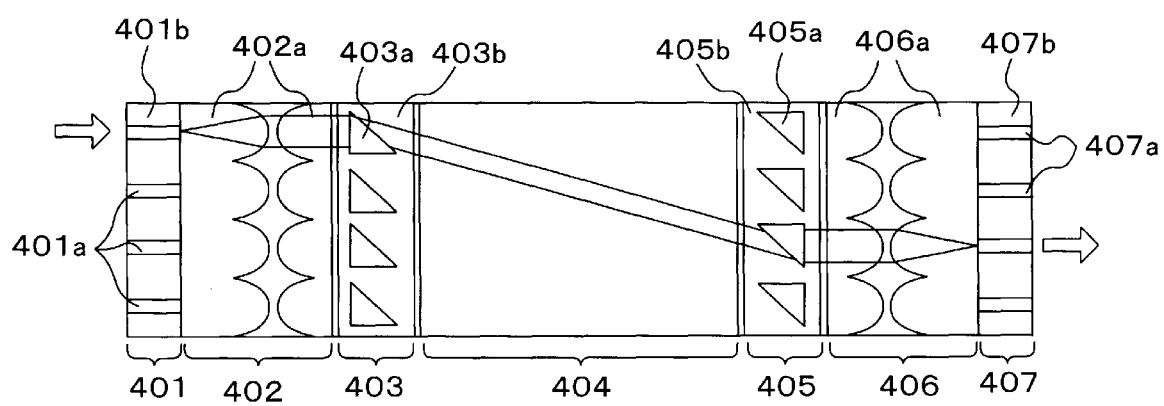
FIG. 36A is a plan view showing an optical switch module according to a fifth embodiment of the present invention.
Figure 36B:
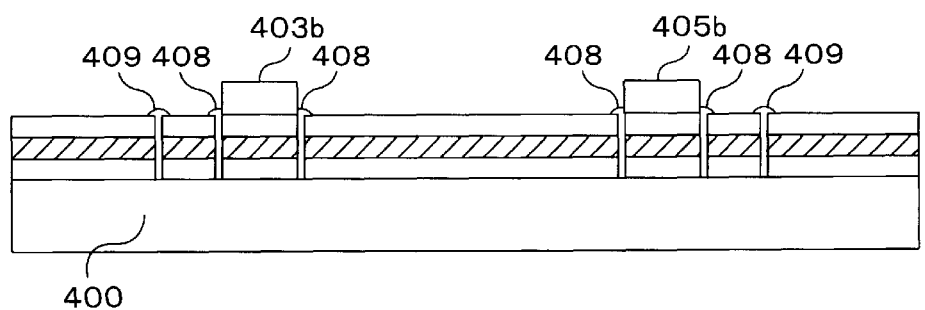
FIG. 36B is a sectional view showing the same.

FIG. 36A is a plan view showing an optical switch module according to a fifth embodiment of the present invention, and FIG. 36B is a sectional view showing the same.

This optical switch module is constructed by an incident side optical waveguide portion 401, a collimate portion 402, an incident side optical deflecting element portion 403, a common optical waveguide 404, an outgoing side optical deflecting element portion 405, a converging portion 406, and an outgoing side optical waveguide portion 407.

The incident side optical waveguide portion 401, the collimate portion 402, the common optical waveguide 404, the converging portion 406, and the outgoing side optical waveguide portion 407 are formed integrally on the optical switch module substrate (first substrate) 400. In contrast, in the incident side optical deflecting element portion 403 and the outgoing side optical deflecting element portion 405, optical deflecting element units 403b, 405b that are formed separately from the incident side optical waveguide portion 401, the collimate portion 402, the common optical waveguide 404, the converging portion 406, and the outgoing side optical waveguide portion 407 are jointed to the optical switch module substrate 400.

In order to reduce the optical loss by the reflection at the end surface, a refracting medium (e.g., resin) 408 is filled between the incident side optical deflecting element unit 403b, the collimate portion 402 and the common optical waveguide 404 and between the outgoing side optical deflecting element unit 405b, the common optical waveguide 404 and the converging portion 406. As this refracting medium 408, the medium having the intermediate refractive index between the refractive index of the core layer of the collimate portion 402, the common optical waveguide 404, and the converging portion 406 and the refractive index of the core layer of the optical deflecting element units 403b, 405b is employed. If the optical loss due to the reflection on the end surface even after the refracting medium 408 is filled is large, the reflection preventing film having the multi-layered structure can be formed on the end surfaces of the optical deflecting element units 403b, 405b to overcome such large optical loss. The reflection preventing film is employed in various optical parts, and thus its explanation will be omitted herein because such reflection preventing film belongs to the well-known technology.

The incident side optical waveguide portion 401 comprises four optical waveguides (cores) 401a, and a cladding layer 401b for covering these optical waveguides 401a to confine the light in the optical waveguides 401a because of the difference in the refractive index. Similarly to this, the outgoing side optical waveguide portion 407 comprises four optical waveguides (cores) 407a, and a cladding layer 407b for covering these optical waveguides 407a to confine the light in the optical waveguides 407a because of the difference in the refractive index.

The collimate portion 402 consists of four sets of collimate lens groups, and each collimate lens group is composed of a pair of convex lenses 402a. This convex lens 402a is a two-dimensional lens consisting of the core layer and cladding layers that sandwich the core layer vertically. A refracting medium 409 for adjusting the refractive index is filled between these convex lenses 402a. Each collimate lens group is arranged at the position to respond to the optical waveguide 401a respectively.

The incident side optical deflecting element unit 403b consists of four optical deflecting elements 403a that are formed integrally on the same substrate (second substrate). These optical deflecting elements 403a have basically the same structure as the optical deflecting element in the third or fourth embodiment. Also, the outgoing side optical deflecting element unit 405b consists of four optical deflecting elements 405a that are formed integrally on the same substrate (second substrate). These optical deflecting elements 405a have basically the same structure as the optical deflecting element in the third or fourth embodiment.

The common optical waveguide 404 is composed of the slab waveguide. The light that is passed through the incident side optical deflecting element portion 403 travels straightly in the common optical waveguide 404, and reaches the outgoing side optical deflecting element portion 405.

The converging portion 406 consists of four sets of converging lens groups, and each converging lens group is composed of a pair of convex lenses 406a. This convex lens 406a is a two-dimensional lens consisting of the core layer and cladding layers that sandwich the core layer vertically. The refracting medium 409 for adjusting the refractive index is filled between these convex lenses 406a. Each converging lens group is arranged at the position to respond to the optical deflecting element 405a respectively.

Figure 37A:
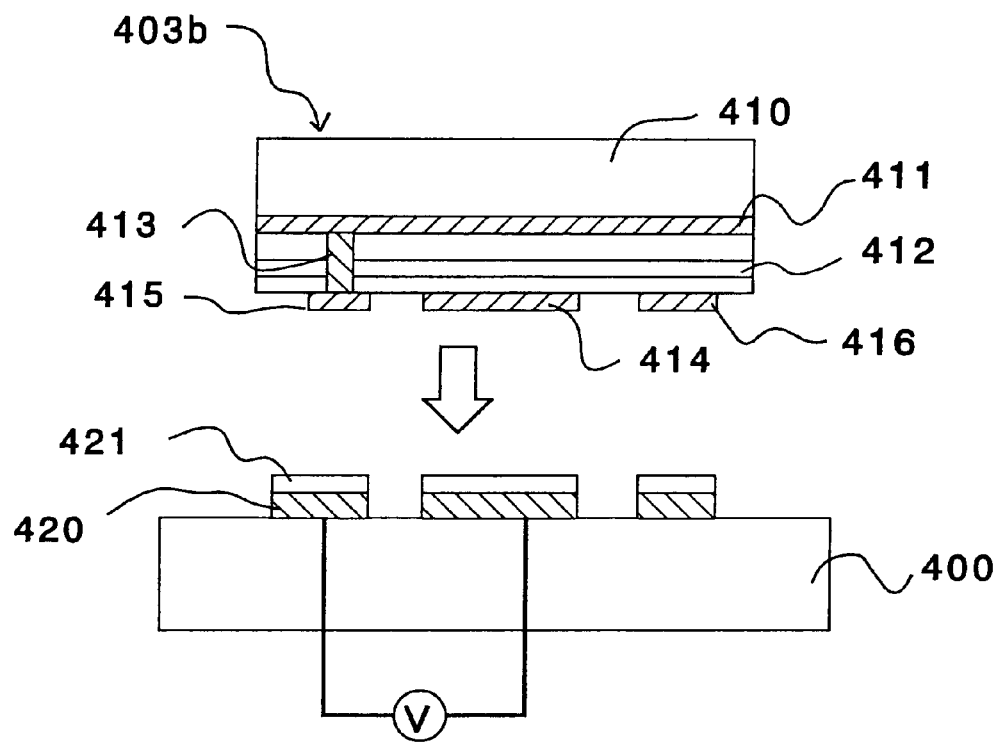
FIGS. 37A and 37B are schematic sectional views showing a method of connecting the optical deflecting element unit and the optical switch module substrate.
Figure 37B:
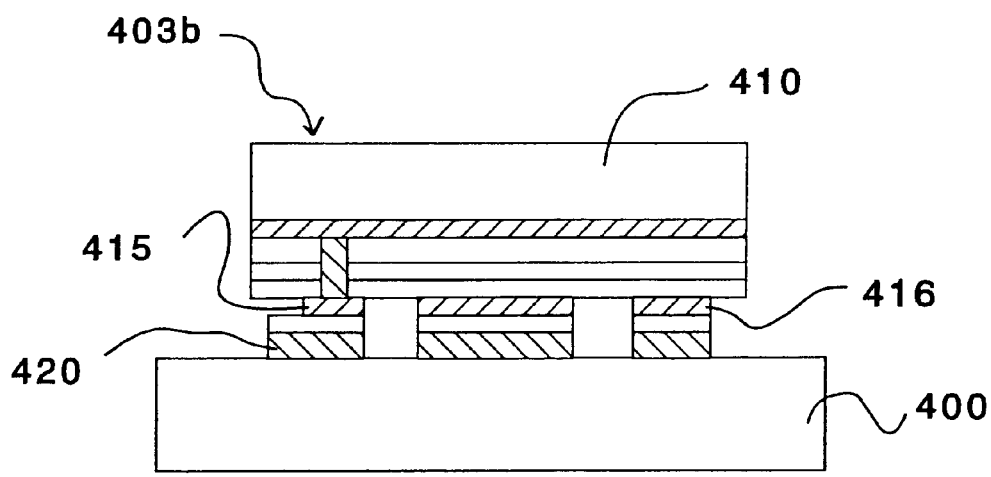

FIGS. 37A and 37B are schematic sectional views showing a method of connecting the optical deflecting element unit 403b and the optical switch module substrate 400. In FIGS. 37A and 37B, a substrate 410 of the optical deflecting element unit 403b is illustrated on the upper side and an upper electrode 414 thereof is illustrated on the lower side.

A lower electrode 411 made of conductive material such as the metal is formed on a surface of the substrate 410 (the lower side in FIGS. 37A and 37B) of the optical deflecting element unit 403b, while an optical waveguide 412 consisting of a core layer and a cladding layer is formed on a surface of the lower electrode 411 (the lower side in FIGS. 37A and 37B). A wedge-shaped (right triangular shape) upper electrode 414, a leading electrode 415 connected to the lower electrode 411 via a column-like conductor 413 that passes through the optical waveguide 412, and a dummy electrode 416 are formed on a surface of the optical waveguide 412 (the lower side in FIGS. 37A and 37B). The dummy electrode 416 is provided to connect horizontally and firmly the optical deflecting element portion 403 to the optical switch module substrate 400. No electric signal is supplied to the dummy electrode 416.

Also, it is preferable that a copper thin film should be formed on surfaces of these electrodes 414, 415, 416 with regard to the joinability to the solder.

In contrast, electrodes 420 are formed at positions, which coincide with the upper electrode 414, the leading electrode 415, and the dummy electrode 416 of the optical deflecting element 403a respectively, on the optical switch module substrate 400. The electrodes 420 connected to the upper electrode 414 and the leading electrode 415 are connected to a wiring (not shown) to which a signal of driving the optical deflecting element 403a is supplied.

In (indium) is adhered onto the electrodes 420 on the optical switch module substrate 400 side as a solder 421. The optical deflecting element unit 403b can be mounted on the substrate 400 by using the apparatus such as the flip-chip bonder, or the like, which is normally employed to mount the semiconductor device (IC: Integrated Circuit). In this case, the optical deflecting element unit 403b can be mounted on the substrate 400 by jointing the electrodes 420 on the substrate 400 to the electrodes 414, 415, 416 on the optical deflecting element unit 403b by the solder 421, while directing the surface on which the upper electrode 414, the leading electrode 415, and the dummy electrode 416 are formed to the optical switch module substrate 400. Therefore, the electric connection between the optical deflecting element unit 403b and the substrate 400 can be executed at the same time. Similarly to this, the outgoing side optical deflecting element unit 405b can be mounted onto the optical switch module substrate 400.

As shown in FIG. 36B, when the optical deflecting element units 403b, 405b are mounted onto the optical switch module substrate 400, the positions of the core layers of the optical waveguides of the optical deflecting element units 403b, 405b and the positions of the core layers of the collimate portion 402, the common optical waveguide 404, and the converging portion 406 must be set to coincide mutually. For that purpose, the thicknesses of the core layer and the cladding layer of the optical deflecting element units 403b, 405b must be managed precisely.

An operation of the optical switch module of the fifth embodiment will be explained hereunder.

The light that enters into any one optical waveguide 401a of the incident side optical waveguide portion 401 travels in the optical waveguide 401a while reflecting on the interface between the core layer and the cladding layer, and then is emitted from the end portion of the optical waveguide 401a to spread radially. This light is shaped into the parallel light by the collimate portion 402, and then deflected into a predetermined direction in response to the applied voltage by the optical deflecting element 403a. The light that is output from the optical deflecting element 403a travels straightly in the common optical waveguide 404 to reach any one optical deflecting element 405a of the outgoing side optical deflecting element portion 405, and then is refracted in response to the applied voltage by the optical deflecting element 405a.

The light that is refracted by the optical deflecting element 405a is converged by the converging portion 406 to enter into the outgoing side optical waveguide 407a, and then is emitted from the end portion of the optical waveguide 407a to the outside.

If the voltage applied to the incident side optical deflecting element 403a and the outgoing side optical deflecting element 405a a is adjusted, the light that is input into any optical waveguide of four incident side optical waveguides 401a can be transmitted to any optical waveguide of four outgoing side optical waveguides 407a.

In the fifth embodiment, only the optical deflecting element units 403b, 405b must be fabricated by the material with the electrooptic effect, so that the incident side optical waveguide portion 401, the collimate portion 402, the common optical waveguide 404, the converging portion 406, and the outgoing side optical waveguide portion 407 can be fabricated by the material having no electrooptic effect. Normally it is difficult to fabricate the crystal having the small optical loss if the crystal material with the electrooptic effect is employed. Therefore, it is not preferable to form the overall optical switch module by the crystal material with the electrooptic effect.

In contrast, in the fifth embodiment, only the optical deflecting element units 403b, 405b must be formed by the crystal material having the electrooptic effect, and other portions can be formed by the crystal material having the small optical loss. As a result, the optical switch module having the small optical loss can be obtained.

Also, in the fifth embodiment, since the dummy electrodes 416 are formed on the upper electrode forming surfaces of the optical deflecting element units 403b, 405b and also the dummy electrodes 416 and the electrode 420 on the optical switch module substrate 400 side are connected, the optical deflecting element units 403b, 405b can be connected firmly. In addition, if the forming positions of the dummy electrode 416 are selected properly, the optical deflecting element units 403b, 405b can be jointed in the situation that they are maintained in parallel with the surface of the substrate 400.

(Variation)

Figure 38:
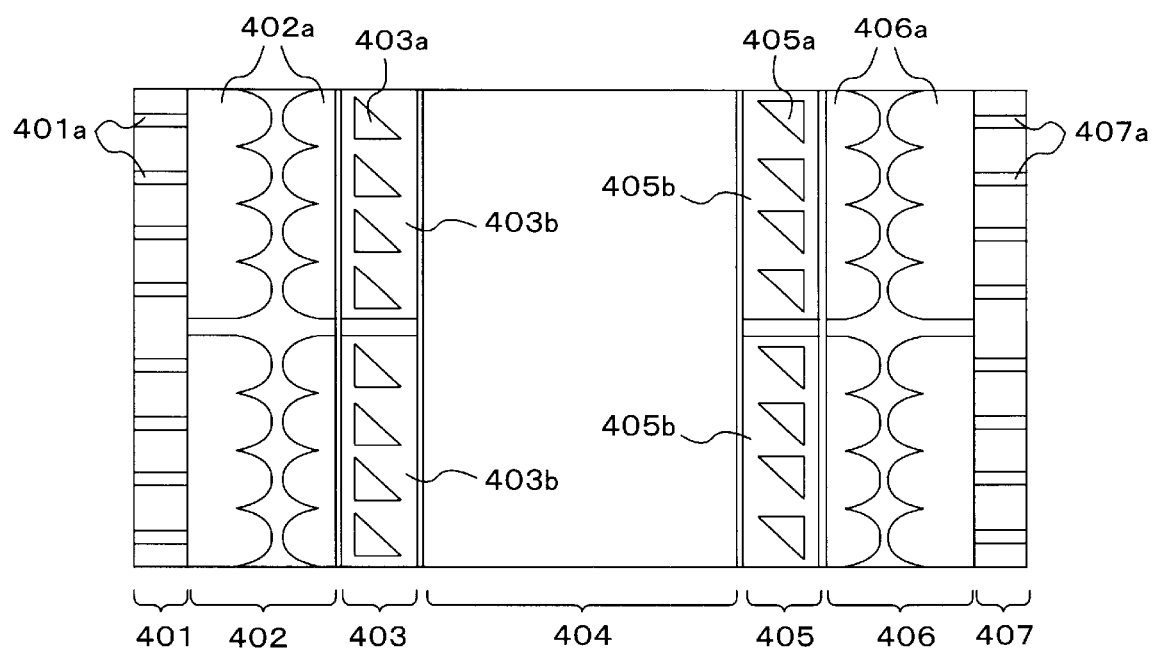
FIG. 38 is plan view showing an optical switch module according to a variation of the fifth embodiment of the present invention.

FIG. 38 is plan view showing an optical switch module according to a variation of the fifth embodiment of the present invention. In FIG. 38, the same symbols are affixed to the same elements as those in FIG. 36A, and therefore their detailed explanation will be omitted.

In this example, eight sets of incident side optical waveguides 401a, the collimate portion 402 consisting of eight sets of collimate lens groups, the converging portion 406 consisting of eight sets of converging lens groups, and eight sets of outgoing side optical waveguides 407a are formed on the substrate 400. Then, two optical deflecting element units 403b in which four optical deflecting elements 403a are formed integrally are arranged in parallel in the incident side optical deflecting element portion 403. Similarly to this, two optical deflecting element units 405b in which four optical deflecting elements 405a are formed integrally are arranged in parallel in the outgoing side optical deflecting element portion 405.

If the number of channels is increased and the scale of the optical switch module is enlarged, the optical deflecting elements are needed in number in conformity with the scale of the optical switch module in the incident side optical deflecting element portion and the outgoing side optical deflecting element portion. If it is tried to form these optical deflecting elements on one substrate, the yield of the optical switch module is lowered because of the defect or the bowing of the optical deflecting element unit.

For this reason, as shown in this example, the optical deflecting element units 403b, 405b are constructed by several (four in this example) optical deflecting elements respectively, and also the optical deflecting element units 403b, 405b are arranged in plural in parallel respectively. Thus, the reduction in the yield can be avoided.

In this case, since the optical deflecting element portions 403, 405 are divided into plural optical deflecting element units 403b, 405b, the number of the common electrodes formed on the optical switch module substrate is increased. However, since these common electrodes can be connected mutually on the optical switch module substrate, the number of the wirings that are to be extended to the outside of the optical switch module substrate is not changed.

Also, the common optical waveguide 404 cannot be divided, but the incident side optical waveguide portion 401, the collimate portion 402, the converging portion 406, and the outgoing side optical waveguide portion 407 may be formed to be divided into plural units.

Sixth Embodiment

Figure 39:
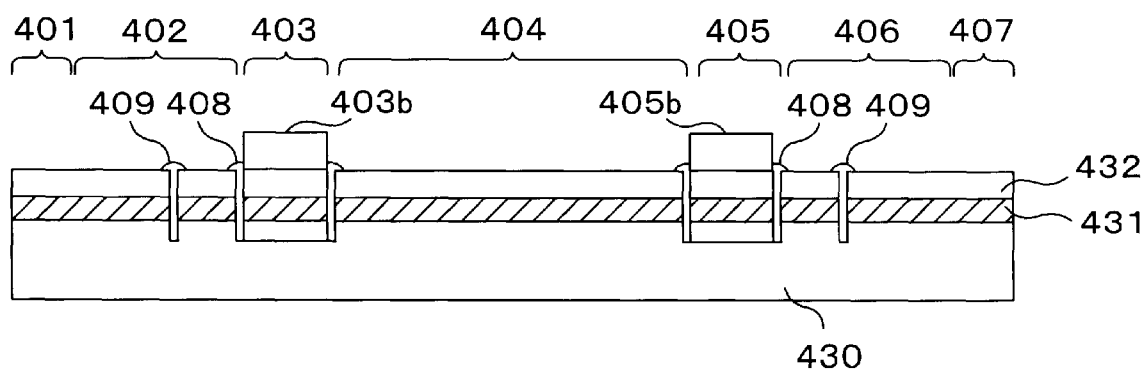
FIG. 39 is a sectional view showing an optical switch module according to a sixth embodiment of the present invention.

FIG. 39 is a sectional view showing an optical switch module according to a sixth embodiment of the present invention. The sixth embodiment shows an example in which the elements except for the optical deflecting element units are formed by the same material by using the silica waveguide technology.

First, a quartz substrate 430 is prepared. This silica substrate 430 serves as the lower cladding layer of the optical waveguide. Then, a core layer 431 and an upper cladding layer 432 are formed on the silica substrate 430 by the well-known PLC (Planar Lightwave Circuit) technology.

Then, the recesses that have a predetermined shape respectively are formed by etching the collimate portion 402, the incident side optical deflecting element portion 403, the outgoing side optical deflecting element portion 405, and the converging portion 406.

Then, like the fifth embodiment, the optical deflecting element units 403b, 405b are mounted onto the incident side optical deflecting element portion 403 and the outgoing side optical deflecting element portion 405 respectively, and the refracting medium 408 is filled into the clearances of the incident side optical deflecting element portion 403 and the clearances of the outgoing side optical deflecting element portion 405. Also, the refracting medium 409 is filled into the recesses of the collimate portion 402 and the converging portion 406.

In this manner, the optical switch module of the sixth embodiment can be formed.

What is claimed is:

1. An optical switch module comprising:
a collimate portion for collimating individually a plurality of light signals respectively;
a plurality of first optical deflecting elements for switching propagation directions of the light signals, which are passed through the collimate portion, individually respectively by utilizing an electrooptic effect;
a common optical waveguide through which the light signals, which are passed through the plurality of first optical deflecting elements respectively, are propagated;
a plurality of second optical deflecting elements for switching the propagation directions of the light signals, which are passed through the common optical waveguide, individually respectively by utilizing the electrooptic effect; and
a converging portion for converging the light signals, which are passed through the plurality of second optical deflecting elements, individually respectively;
wherein each of the first optical deflecting elements and the second optical deflecting elements is constructed by one or plural prism pairs, and each of the prism pairs includes a slab waveguide formed of material having the electrooptic effect, first and second upper electrodes formed as a wedge shape and arranged on a light signal passing area of the slab waveguide such that wedge top ends are directed mutually oppositely, and first and second lower electrodes arranged under the slab waveguide so as to oppose to the first and second upper electrodes.

2. An optical switch module according to claim 1, wherein a first potential is applied commonly to the first upper electrodes and the second lower electrodes of the prism pairs, and a second potential is applied commonly to the second upper electrodes and the first lower electrodes.

3. An optical switch module according to claim 1, wherein the collimate portion, the first optical deflecting elements, the common optical waveguide, the second optical deflecting elements, and the converging portion are formed integrally.

4. An optical switch module according to claim 1, wherein a light propagation path is switched by causing the first optical deflecting elements and the second optical deflecting elements to cooperate with each other.

5. A light signal switching device comprising:
a first optical switch module group constructed by arranging a plurality of first optical switch modules;
a second optical switch module group constructed by arranging a plurality of second optical switch modules and connected optically to the first optical switch module group; and
a third optical switch module group constructed by arranging a plurality of third optical switch modules and connected optically to the second optical switch module group;
wherein each of the first, second and third optical switch module includes (1) a collimate portion for collimating individually a plurality of light signals respectively, (2) a plurality of first optical deflecting elements for switching propagation directions of the light signals, which are passed through the collimate portion, individually respectively by utilizing an electrooptic effect, (3) a common optical waveguide through which the light signals, which are passed through the plurality of first optical deflecting elements respectively, are propagated, (4) a plurality of second optical deflecting elements for switching the propagation directions of the light signals, which are passed through the common optical waveguide, individually respectively by utilizing the electrooptic effect, and (5) a converging portion for converging the light signals, which are passed through the plurality of second optical deflecting elements, individually respectively, and
wherein each of the first and second optical deflecting elements is constructed by one or plural prism pairs, and each of the prism pairs includes a slab waveguide formed of material having the electrooptic effect, first and second upper electrodes formed as a wedge shape and arranged on a light signal passing area of the slab waveguide such that wedge top ends are directed mutually oppositely, and first and second lower electrodes arranged under the slab waveguide so as to oppose to the first and second upper electrodes.

6. A light signal switching device according to claim 5, wherein the second optical switch module group is arranged in a state that the second optical switch module group is rotated by 90 degree to the first optical switch module group and the third optical switch module group.

7. A light signal switching device according to claim 5, wherein each of the first, second and third optical switch module has n input ports (where n is an integer of 2 or more) and n output ports, and each of the first, second and third optical switch module groups consists of n optical switch modules.

8. A light signal switching device according to claim 5, wherein a first potential is applied commonly to the first upper electrodes and the second lower electrodes of the prism pairs, and a second potential is applied commonly to the second upper electrodes and the first lower electrodes.

9. A light signal switching device according to claim 5, wherein the first optical switch module group and the second optical switch module group and the second optical switch module group and the third optical switch module group are optically connected via optical connectors having a plurality of lenses, which are aligned in a one-dimensional or two-dimensional direction, respectively.

10. A light signal switching device according to claim 5, wherein an optical branching filter for distributing wavelength-multiplexed light signals every wavelength is connected to an input side of the first optical switch module group, and an optical multiplexer is connected to an output side of the third optical switch module group.

11. A light signal switching device according to claim 10, wherein an optical amplifier is connected to an output side of the optical multiplexer.

12. A light signal switching device according to claim 10, wherein at least one of the optical branching filter and the first optical switch module group and the third optical switch module group and the optical multiplexer is connected via an optical connector that has an interlayer shift mirror for shifting a light between layers and an in-plane shift mirror for shifting the light in a plane.

13. An optical switch module comprising:
   a collimate portion for collimating individually a plurality of light signals respectively;
   a plurality of first optical deflecting elements for switching propagation directions of the light signals, which are passed through the collimate portion, individually respectively by utilizing an electrooptic effect;
   a common optical waveguide through which the light signals, which are passed through the plurality of first optical deflecting elements respectively, are propagated;
   a plurality of second optical deflecting elements for switching the propagation directions of the light signals, which are passed through the common optical waveguide, individually respectively by utilizing the electrooptic effect;
   a converging portion for converging the light signals, which are passed through the plurality of second optical deflecting elements, individually respectively; and
   a first substrate for supporting the collimate portion, the first optical deflecting elements, the common optical waveguide, the second optical deflecting elements, and the converging portion;
   wherein at least one of the first optical deflecting elements and the second optical deflecting elements is constructed by a second substrate, a first electrode formed on a first-substrate side surface of the second substrate, an optical waveguide formed on a first-substrate side surface of the first electrode and having an electrooptic effect, a wedge-shaped second electrode formed on a first-substrate side surface of the optical waveguide to oppose to the first electrode, and a leading electrode formed on the first-substrate side surface of the optical waveguide and connected electrically to the first electrode, whereby the second electrode and the leading electrode are jointed to electrodes of the first substrate.

14. An optical switch module according to claim 13, wherein at least one of the first and second optical deflecting elements has dummy electrodes that are independent from the first electrode and the second electrode, and electrodes that are to be connected to the dummy electrodes are provided on the first substrate.

15. An optical switch module according to claim 13, wherein the collimate portion, the common optical waveguide, and the converging portion are formed integrally with the first substrate.

16. An optical switch module according to claim 13, wherein a plurality of first optical deflecting elements are formed integrally on one second substrate.

17. An optical switch module according to claim 16, wherein the second substrate is provided in plural.

18. An optical switch module according to claim 13, wherein a plurality of second optical deflecting elements are formed integrally on one second substrate.

19. An optical switch module according to claim 18, wherein the second substrate is provided in plural.

* * * * *